(12) United States Patent
Chien et al.

(10) Patent No.: US 11,035,474 B2
(45) Date of Patent: Jun. 15, 2021

(54) FLUOROPLASTIC BUTTERFLY VALVE STRUCTURE

(71) Applicant: BUENO TECHNOLOGY CO., LTD., Tainan (TW)

(72) Inventors: Huan-Jan Chien, Tainan (TW); Po-Wen Chen, Tainan (TW)

(73) Assignee: Bueno Technology Co., Ltd., Tainan (TW)

( * ) Notice: Subject to any disclaimer, the term of this patent is extended or adjusted under 35 U.S.C. 154(b) by 0 days.

(21) Appl. No.: 16/432,165

(22) Filed: Jun. 5, 2019

(65) Prior Publication Data

US 2020/0072359 A1 Mar. 5, 2020

(51) Int. Cl.
*F16K 1/22* (2006.01)
*F16K 27/02* (2006.01)
*F16K 1/226* (2006.01)

(52) U.S. Cl.
CPC ............ *F16K 1/222* (2013.01); *F16K 1/226* (2013.01); *F16K 27/0218* (2013.01)

(58) Field of Classification Search
CPC ........ F16K 1/222; F16K 1/224; F16K 1/2261; F16K 1/2263; F16K 1/2265; F16K 1/2268; F16K 27/0218; F16K 27/0272
See application file for complete search history.

(56) References Cited

U.S. PATENT DOCUMENTS 3,750,698 A * 8/1973 Walchle .................. F16K 1/22
                                                    137/375
3,778,028 A * 12/1973 Graves ................. F16K 1/2265
                                                    251/306
4,351,511 A * 9/1982 Garrigues ............ F16K 1/2263
                                                    251/174

FOREIGN PATENT DOCUMENTS

| CN | 100376828 C | 3/2008 | |
|---|---|---|---|
| CN | 204344951 U | 5/2015 | |
| CN | 106415087 A | 2/2017 | |
| DE | 2533155 A1 * | 12/1976 | ........... F16K 1/2268 |
| JP | S54-103645 U | 7/1979 | |
| JP | S55-142169 A | 11/1980 | |
| JP | H01-3160 U | 1/1989 | |
| JP | H10-78143 A | 3/1998 | |
| JP | 2003-014139 A | 1/2003 | |
| JP | 2003-166654 A | 6/2003 | |
| JP | 2004-239343 A | 8/2004 | |
| JP | 2007-032683 A | 2/2007 | |
| JP | 2012-219819 A | 11/2012 | |

(Continued)

OTHER PUBLICATIONS

Communication From a Foreign Patent Office Regarding Corresponding Application (2019-113167).

*Primary Examiner* — Hailey K. Do
(74) *Attorney, Agent, or Firm* — Rosenberg, Klein & Lee

(57) ABSTRACT

A fluoroplastic butterfly valve structure is disclosed that includes an inner metallic butterfly disc and an outer fluoroplastic material enclosing the metallic butterfly disc within a valve body. The butterfly disc has a board-like or cone-like cross section. A fluoroplastic lining has an interference fit with the butterfly disc. A back-up ring is provided between an inner surface of the valve body made of high temperature resistant rubber. The butterfly disc has a complex sealing structure, which includes an unequal-width conical surface and an unequal-width curved surface. The unequal-width curved surface is disposed in a closing direction of the butterfly disc for preventing interference sliding thereof.

12 Claims, 23 Drawing Sheets

(56) References Cited

FOREIGN PATENT DOCUMENTS

| JP | 2016-041967 A | 3/2016 |
|---|---|---|
| JP | WO2015147197 A1 | 4/2017 |
| TW | 496934 B | 8/2002 |

* cited by examiner

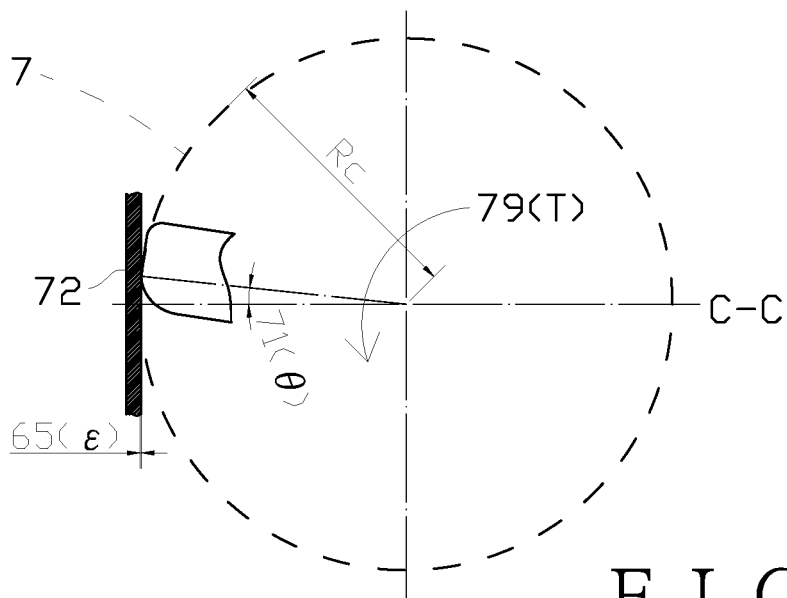
FIG. 5Ai
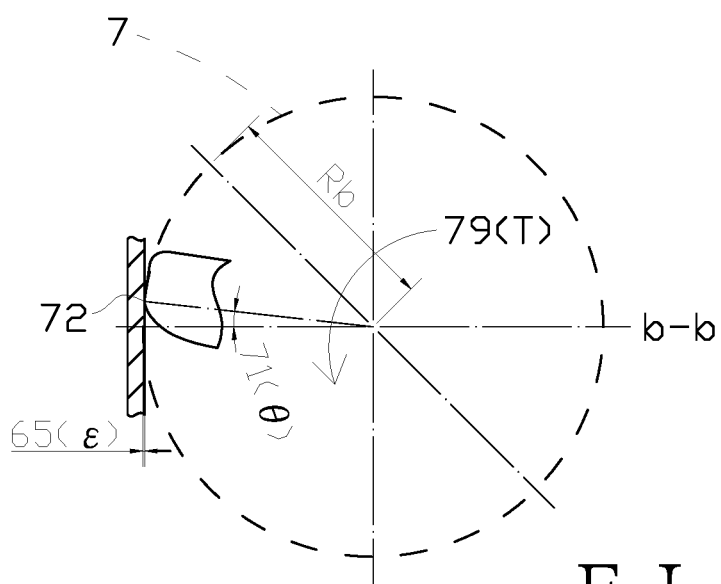
FIG. 5Aii
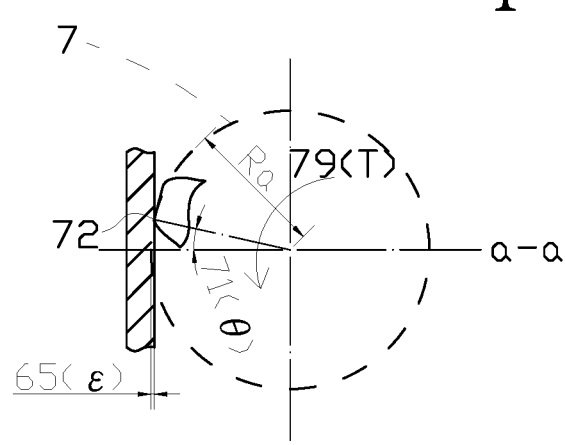
FIG. 5Aiii

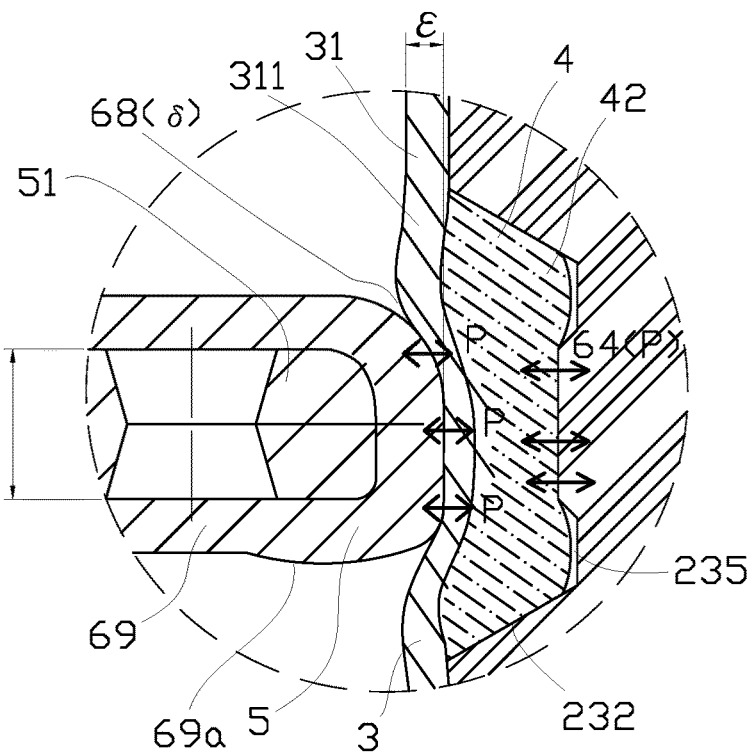
F I G . 5B
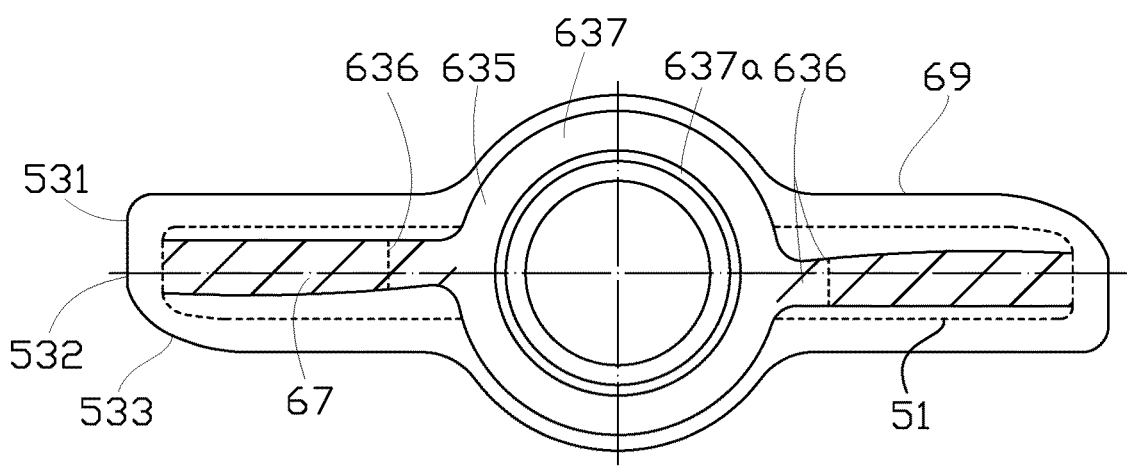
F I G . 5C

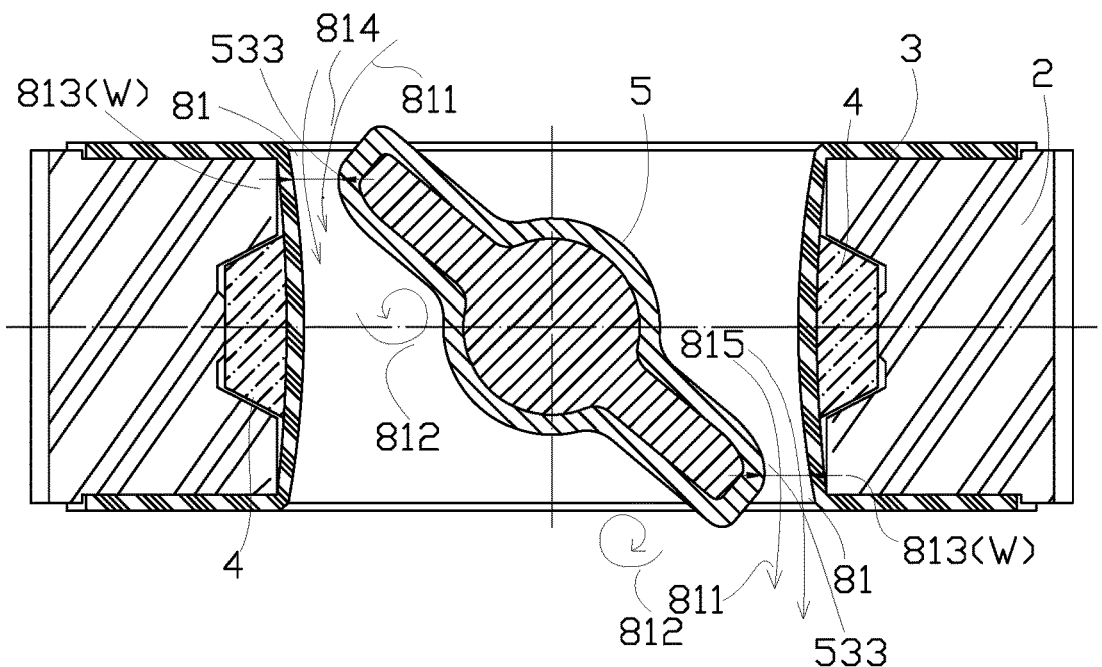
F I G . 6A
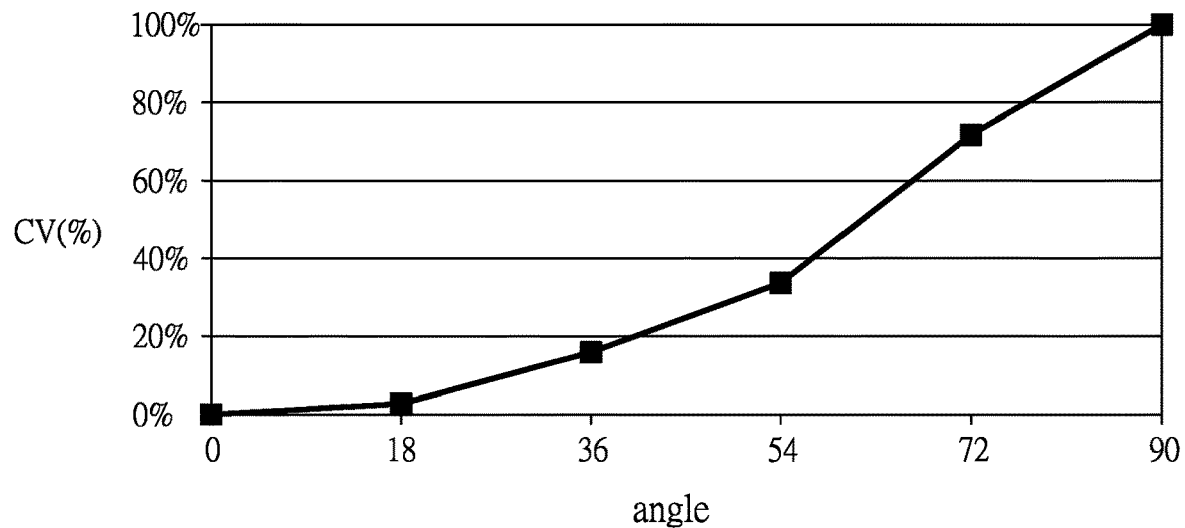
F I G . 6Bi

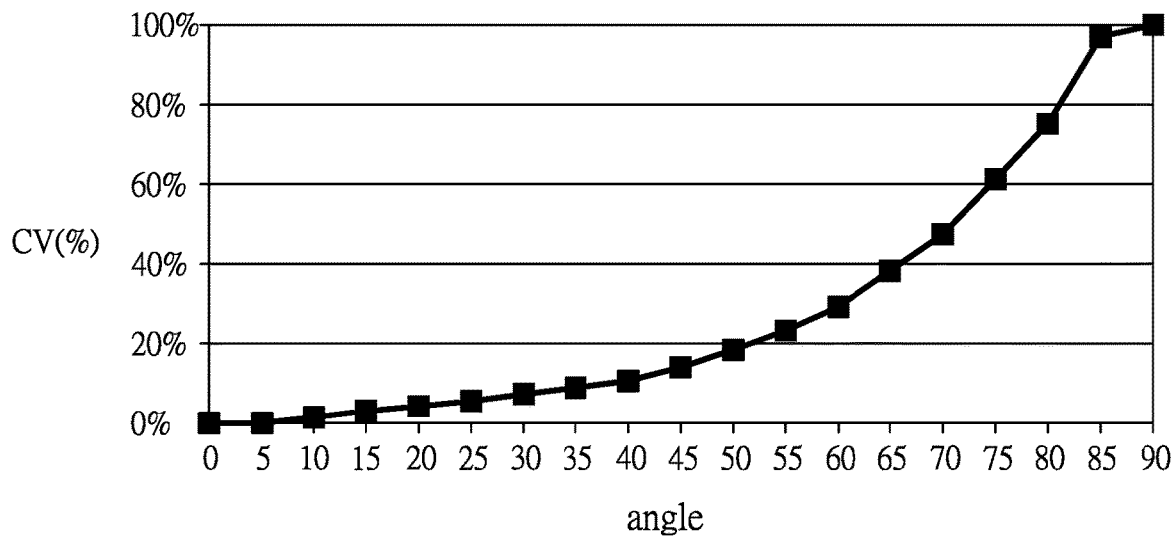
FIG. 6Bii
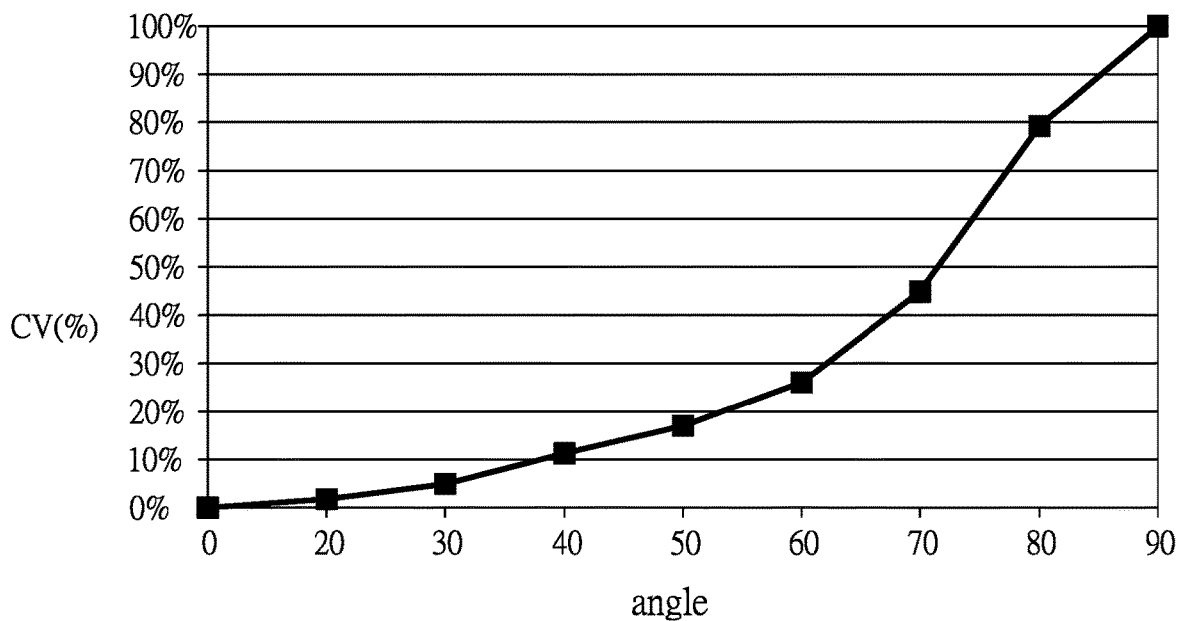
FIG. 6Biii

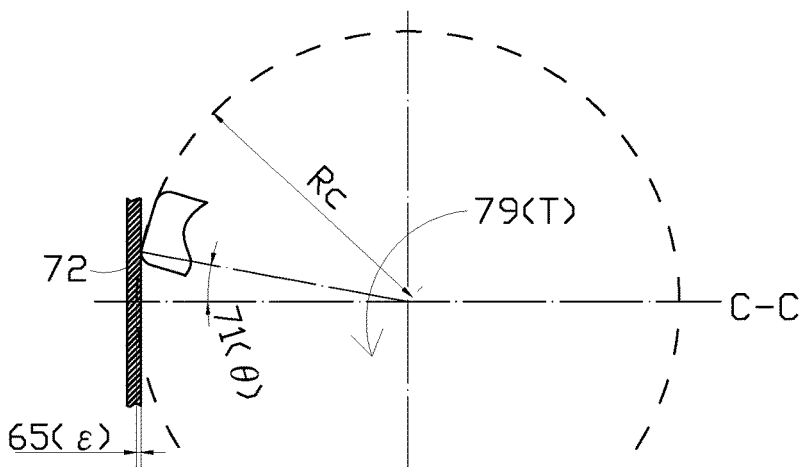
FIG. 8Ai
(PRIOR ART)
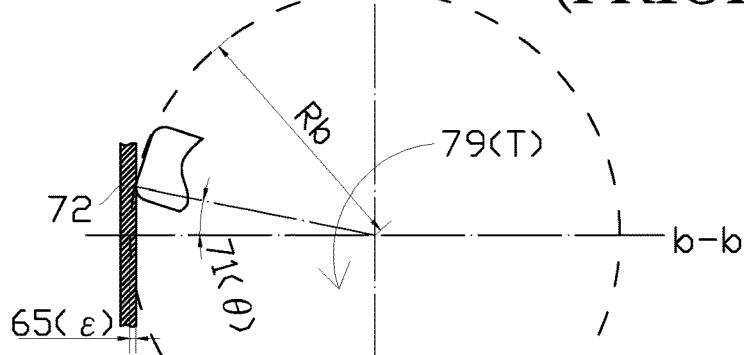
FIG. 8Aii
(PRIOR ART)
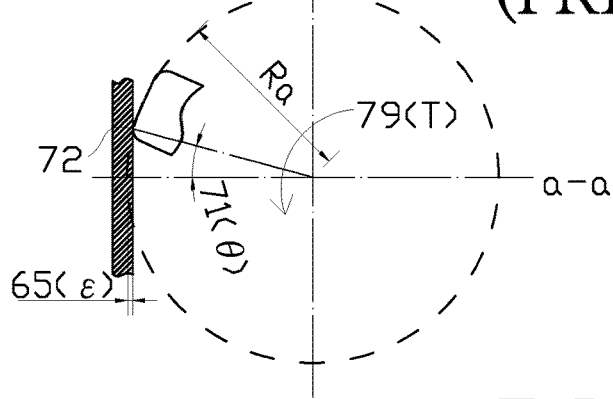
FIG. 8Aiii
(PRIOR ART)

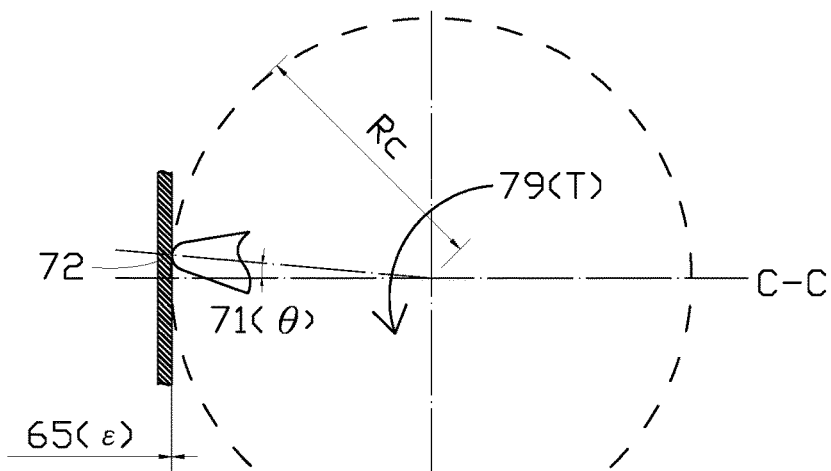
FIG. 9Ai
(PRIOR ART)
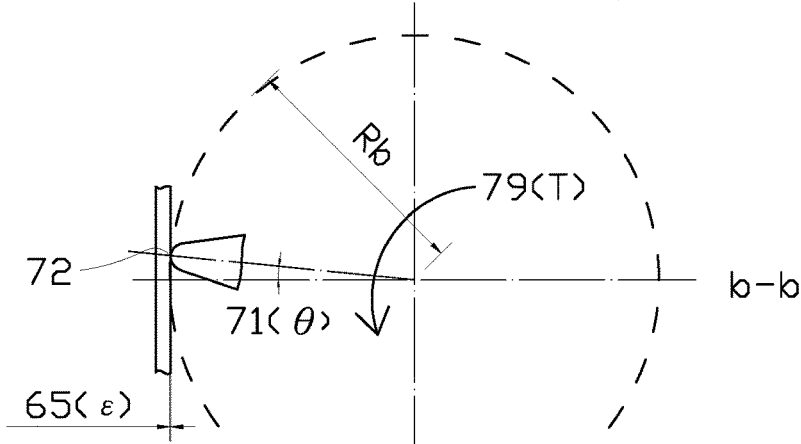
FIG. 9Aii
(PRIOR ART)
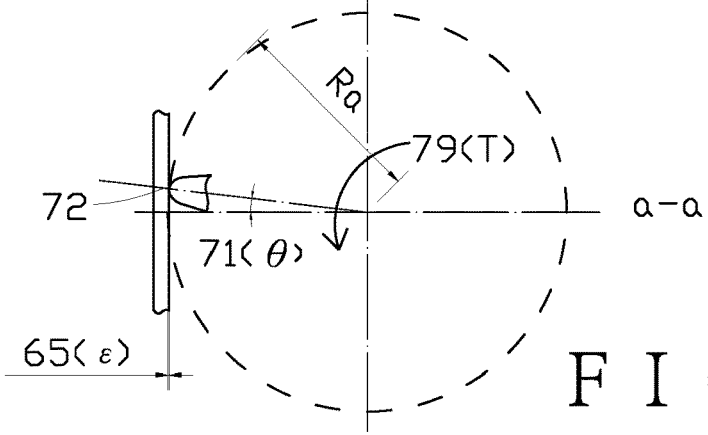
FIG. 9Aiii

FLUOROPLASTIC BUTTERFLY VALVE STRUCTURE

BACKGROUND OF THIS INVENTION

1. Field of this Invention

This invention relates to a fluoroplastic butterfly valve structure and relates particularly to a symmetrical butterfly valve structure in which a corrosion resistant and temperature resistant fluoroplastic lining is installed. A butterfly disc of the valve structure uses an external fluoroplastic encapsulation to enclose an inner metallic butterfly disc, thereby improving the sealing mechanism of a butterfly disc outer rim, reducing the demand for the torque of a valve shaft, prolonging the service life of the fluoroplastic lining, and increasing the resistance to pressures and temperatures at the time of closing for sealing. The outer rim of the butterfly disc has an interference sliding while closing, and a tight press sealing is attained in a full closed state. Therefore, specifications of the butterfly valve adapted to special purposes can be achieved. For example:

Corrosive liquid: transport fluid, such as hydrofluoric acid, hydrochloric acid and sulfuric acid.

Highest temperature: special purpose ≤200° Celsius.

Highest pressure: special purpose ≤3 kg@200° Celsius.

2. Description of the Related Art

Referring to FIGS. 7A, 7B, 7C and 7D, a conventional fluoroplastic symmetrical butterfly valve 9 is used to transport fresh water and corrosive liquid adapted to ordinary temperatures. The fluoroplastic butterfly valve 9 uses a rubber with low hardness and high elasticity to help the fluoroplastic with high bendability. The valve structure includes a valve body 91, a butterfly disc 92, a lining 93, a back-up ring 94, a valve shaft 95, etc.

The valve body 91 is formed in a ring shape and is divided into two semicircular valve bodies, namely an upper valve body and a lower valve body, which are fastened by two fasteners to unite the two-piece valve body 91. An inner peripheral surface 911 of the valve body 91 has a groove 912 in which a back-up ring 94 is installed. It is not shown in the figures that the inner peripheral surface 911 also allows the installation of a lining 93. An upper shaft hole portion 913 and a lower shaft hole portion 914 are respectively disposed on the two-piece valve body.

As shown in FIG. 7C, the back-up ring 94 is made of rubber and mounted between the annular groove 912 of the inner peripheral surface 911 and a tubular portion 931. Therefore, the back-up ring 94 compensates for the insufficient elasticity of the fluoroplastic, provides a high amount of deformation, decreases the demand for torque, provides an inner surface 933 of the lining with the required support of deformation, and provides an butterfly disc outer rim 922 and the inner surface 933 of the lining with a press sealing ability. The material of the back-up ring 94 has the resistance to temperatures.

The ordinary rubber bears the temperature less than or equal to 120° Celsius (≤120° C.), the fluororubber bears the temperature less than or equal to 180° Celsius (≤180° C.) and the silicone rubber bears the temperature less than or equal to 260° Celsius (≤260° C.) equal to 500° Fahrenheit.

Referring to FIG. 7D, the lining 93 has a tubular portion 931 and two ends has a radial flange 932 serving as a sealing surface for a piping connection and using the support of the valve body 91 to reduce the shrinkage and deformation caused by high temperatures. When the valve is closed, the butterfly disc outer rim 922 presses against an inner diametral surface of the tubular portion 931 which is supported by the valve body 91 and the back-up ring 94. This inner diametral surface is called an inner surface 933 of the lining. Most of the tubular portions 931 use a thin structure which applies the back-up ring 94 to provide the sealing operation with required strength, thereby closing the flow of fluid and bearing the pressure and temperature of the fluid. Two ends of the tubular portion 931 in a diametral direction each form a horizontal sealing plane 632. A thickness of the horizontal sealing plane 632 covers an inner diameter and an outer diameter of the tubular portion 931, each of which has a plane structure. A diametral distance between the two horizontal sealing planes 632 is smaller than an inner diameter of the tubular portion 931. The thickness of the sealing plane 632 is larger than a thickness of the tubular portion 931. Two side edges of the sealing plane 632 and the inner diametral surface of the lining are connected at joint edges 633 respectively. The joint edge 633 is formed in an arc shape serving to connect structures with different thicknesses. A shaft hole surface 634 and a shaft hole 937 are formed on the sealing plane 632 to receive the valve shaft 95 (not shown) so that the butterfly disc 92 can rotate to adjust the flow amount, open the valve or close the valve (not shown).

Referring to FIGS. 7C and 7D, an inner diameter of the rubber back-up ring 94 is equal to an inner diameter of the inner peripheral surface 23 and also equal to the outer diameter of the tubular portion 31. However, the outer diameter of the tubular portion 931 protrudes inwards because of the shrinkage and deformation incurred at the time of manufacturing, so the outer diameter of the tubular portion 931 is slightly smaller than the inner diameter of the inner peripheral surface 911. Likewise, the inner diameter of the rubber back-up ring 94 is slightly smaller than the inner diameter of the inner peripheral surface 911 because of the shrinkage and deformation occurred in the manufacturing process. In other words, the inner surface 933 of the lining protrudes inwards slightly by reason of the deformation, and thus an inner radius thereof is reduced after the installation. Therefore, the inner diameter of the inner surface 933 of the lining has a curved cross section 66a provided with a projecting height 66b(h) This design causes a radius of a butterfly disc flank 921 to be larger than the inner radius of the inner surface 933 of the lining, and a packing amount 65(ε) is increased. In the conventional technique, when two fasteners are fastened to unite the two-piece valve body 92, the valve body 92 presses against the rubber back-up ring 94 and the tubular portion 931 because the valve body 91 also leaves a tolerance and a packing room.

Referring to FIGS. 7A and 7B, the butterfly disc 92 is formed in a disc-like structure. The butterfly disc 92 has two sides, hereinafter referred to as butterfly disc flanks 921, and has a board-like cross section, hereinafter referred to as ribbon sealing butterfly disc 92b. This sealing structure is referred to as ribbon sealing 62, and the corresponding butterfly disc outer rim 922 forms an annular curved surface 923. The butterfly disc 92 has a cone-like cross section, hereinafter referred to as linear sealing butterfly disc 92a. This sealing structure is referred to as linear sealing 61, and the corresponding butterfly disc outer rim 922 forms a conical curved surface 924. The outer diameter is slightly larger than the inner diameter of the lining 93, and the radius difference is equal to the packing amount 65(ε). The butterfly disc 92 can suffer a torque 79(T) transmitted by the valve shaft 92 to open and close the butterfly valve 9. The torque 79(T) includes an original torque for the shaft sealing need, a friction torque 794(Tf) generated by a motion, referred to as interference sliding 7, which allows the butterfly disc outer rim 922 to make a packing sliding relative to the inner surface 933 of the lining while opening and closing the butterfly disc 92, a fluid torque 792(Th), and a static pressure torque 793(Tp) including a piping static pressure 82(Ps), as shown in FIGS. 7E and 7F. Two ends of the butterfly disc outer rim 922 in a diametral direction each form a horizontal sealing end surface 635. The sealing end surface 635 is formed in correspondence with the horizontal sealing plane 632 of the lining 93. Two sides of the sealing end surface 635 and the annular curved surface 923 are connected at side cutting edges 636 respectively. The side cutting edge 636 is formed in an arc. The side cutting edge 636 is formed in correspondence with the joint edge 633 of the sealing plane 632 for sealing. The sealing end surface 635 and the sealing plane 632 are axially and perpendicularly pressed against each other for sealing. The sealing between the side cutting edge 636 and the joint edge 633 is changed from a vertical sealing to a radial sealing. However, because the sealing plane 632 and the tubular portion 931 have different thicknesses, a special treatment is required to provide a press sealing to prevent the leakage related to the pressure resistance. When the valve is closed, the butterfly disc outer rim 922 and the inner surface 933 of the lining are tightly forced to form the ribbon sealing 62 or the linear sealing 61, the shaft hole surface 634 and a shaft sealing surface 637 are pressed together, and the joint edge 633 and the side cutting edge 636 fit snugly. These continuous packing surfaces construct a sealing surface 6. Two sealing end surfaces 635 each have a bulging structure, hereinafter referred to as butterfly disc protrusion 927. A shaft hole 928 and a shaft sealing surface 637 are formed at the center of the butterfly disc protrusion 927. The shaft hole 928 serves to receive the valve shaft 95. The shaft sealing surface 637 and the shaft hole surface 634 are pressed against each other for sealing. The shaft sealing surface 637 and the butterfly disc outer rim 922 are connected to form a complete sealing surface 6. Generally, the butterfly disc protrusion 927 is also a portion of the butterfly disc 92 provided with the largest thickness. Some designs use a diametral connection 929 to connect two butterfly disc protrusions 927, as shown in FIG. 7B, while the structure as shown in FIG. 7A does not. The diametral connection 929 and the butterfly disc protrusions 927 can reinforce the strength of the structure but may reduce the area of a flow passage 8 and decrease the performance of the flow amount greatly, namely a decrease in the coefficient Cv, as shown in FIG. 7F.

Referring to FIG. 7A, a portion of the butterfly disc 92 along a cross-sectional line a-a has a rotational radius Ra and is defined as a position near the valve shaft 95. A portion thereof along a cross-sectional line c-c has a rotational radius Rc and is defined as a position perpendicular to the valve shaft has a largest diameter in a horizontal direction. A portion thereof along a cross-sectional line b-b has a rotational radius Rb and is defined as a position between the aforementioned positions.

Referring to FIG. 7E, it shows the generation of the fluid torque 792(Th) of the valve shaft. When two slit passages 81, namely a gradually reducing flow passage 815 and a sharply widening flow passage 814, are formed between two sides of the butterfly disc flanks 921 and the lining 93, a circulation zone 812 having an asymmetrical flow and cavitation generated in a fluid streamline 811 cause the two sides of the butterfly disc flanks 921 to suffer different pressures by which the fluid torque 792(Th) is generated. This phenomenon is more obvious in a large butterfly valve.

FIGS. 8A i, 8Aii, 8Aiii, and 8D show a ribbon sealing butterfly disc 92*b*. FIGS. 9A i, 9Aii, 9Aiii, and 9D show a linear sealing butterfly disc 92*a*. When the butterfly disc 92 is fully open, it orientates with respect to a central axis at 0 degrees. When the butterfly disc 92 is fully closed, it orientates with the central axis at 90 degrees. When the butterfly disc 92 is changed from a full open state to a closed state, the portion along the cross-sectional line a-a is in contact with the rubber lining 93 first, and then the portions along the line b-b and the line c-c are in contact with the lining in sequence. A place where the above elements are in contact is referred to as contact point 72. The contact angle varies according to different shapes of butterfly discs. An included angle, hereinafter referred to as contact angle 71($\theta$), is formed between a joint line defined between the contact point 72 and an axial center of rotation and the central axis of 90 degrees. Under the same packing amount 65($\varepsilon$), the portion along the line a-a has the largest contact angle 71($\theta$), the portion along the line b-b has the smaller contact angle 71($\theta$), and the portion along the line c-c has the smallest contact angle 71($\theta$). It is because the portion along the line a-a has the longest distance between the contact point 72 and an axle center, the portion along the line b-b has the shorter distance between the contact point 72 and the axle center, and the portion along the line c-c has the shortest distance between the contact point 72 and the axle center. Referring to FIGS. 8D and 9D, two sides of the annular curved surface 923 of the ribbon sealing butterfly disc 92*b* each have an edge formed with a rounded corner with a small radius of curvature, hereinafter referred to as butterfly disc corner 923*a*. While rotating, the butterfly disc corner 923*a* is in contact with the inner surface 933 of the lining first, and the conical curved surface 924 of the linear sealing butterfly disc 92*a* is in contact with the inner surface 933 of the lining. The contact angles 71($\theta$) of the ribbon sealing butterfly disc 92*b* at the portions along the aforementioned lines are all larger than those of the linear sealing butterfly disc 92*a*.

When the contact angle 71($\theta$) is larger, the distance of the interference sliding 7 is longer and the deformation of the inner surface 933 of the lining is greater.

Referring to FIGS. 8B and 9B, when the valve is fully closed, the packing amount 65($\varepsilon$) is derived from a difference between an outer radius of the butterfly disc 92 and an inner radius of the lining 93. The compression ratio of the lining 93 is a number of the packing amount 65($\varepsilon$) compared to a thickness 941(*s*4) of the back-up ring 94. The number of the compression ratio varies according to the demand for the pressure resistance and the hardness of the material. A larger compression ratio results in a greater pressure resistance but causes the lining 93 to become more abraded and have a shorter service life. The compression ratio ranges from 15 percent (15%) to 25 percent (25%).

Referring to FIGS. 8C and 9C, a butterfly valve whose caliber is 3 inches is taken as an example. The thickness of a metallic board 92*c* of an outer rim 922 of the conventional ribbon sealing butterfly disc 92*b* provided with the same caliber is 5 mm, and a radius of curvature of the corner 923*a* is 0.5 mm, which provides the sealing width at 4 mm, as shown in FIG. 8C. The thickness of a metallic board 92*c* of an outer rim 922 of the conventional linear sealing butterfly disc 92*a* provided with the same caliber is 2 mm, which provides the sealing width at 2 mm, as shown in FIG. 9C. If the butterfly disc 92 is not fully closed at a right position, there is a risk that the leakage related to static pressure may be incurred.

When the butterfly disc outer rim 922 of the ribbon sealing butterfly disc 92b presses against the inner surface 933 of the lining, the larger the packing amount 65($\varepsilon$) and the sealing width 63(B) are applied, the higher the pressure suffered by the piping static pressure 82(Ps) is attained. When the outer rim 922 of the butterfly disc 92 is the annular curved surface 923 as shown in FIG. 8C, it is desirable to attain a press sealing effect which provides a larger sealing width 63(B), a smaller press pressure 64(P), a lower packing amount 65($\varepsilon$), and have the resistance to high temperatures and high pressure in the operation of pressing against the inner surface 933 of the lining. For example, the sealing width 63(B) is equal to or large than 4 mm ($\geq$4 mm). When a butterfly valve which is 3 inches is taken as an example, the outer rim 922 of the inner metallic butterfly disc 92c of the butterfly disc 92 does not concentrate its press against a fluoroplastic encapsulation 69 to prevent a large amount of encapsulation deformation 69a, and a lining deformation 68($\delta$) generated by the inner surface 933 of the lining is smaller. When the outer rim 922 of the butterfly disc is the conical curved surface 924 as shown in FIG. 9C, it is desirable to attain a sealing effect which provides a smaller sealing width 63(B), a higher press pressure 64(P), and a larger packing amount 65($\varepsilon$) in the operation of pressing against the inner surface 933 of the lining. For example, the sealing width 63(B) is equal to or less than 3 mm ($\leq$3 mm). When a butterfly valve which is 3 inches is taken as an example, the narrow outer rim 922 of the inner metallic butterfly disc 92c of the butterfly disc 92 concentrates its press against the fluoroplastic encapsulation 69 and a large amount of encapsulation deformation 69a is generated, and the lining deformation 68($\delta$) generated by the inner surface 933 of the lining is relatively larger. It is clear that the width of the sealing surface 6 of the linear sealing 61 is smaller than that of the ribbon sealing 62.

Referring to FIG. 9C, when the butterfly disc 92 is not correctly closed, the packing amount 65($\varepsilon$) and the sealing width 63(B) of the butterfly disc outer rim 922 are insufficient and the leakage is easily incurred, in particular the severe shortage for the sealing width 63(B) of the linear sealing 61. The measure of the conventional design is directed to the portion located in the horizontal diameter along the cross-sectional line c-c and renders the outer diameter of butterfly disc 92 unable to be a full circle. Instead, it is analogous to an elliptical shape. This causes a partial increase of the packing amount 65($\varepsilon$) along the line c-c to prevent the leakage at the time of closing incorrectly. However, there is an increase in a friction force 75(F) and a corresponding increase in the demand for the torque 79(T) of the valve shaft during the closing process.

Referring to FIG. 8E, when there is an interference sliding 7, a contact surface where the outer rim 922 of the butterfly disc 92 is in contact with the lining deformation 68($\delta$) forms a sliding surface and defines a sliding angle 74($\phi$). A tangent of the sliding surface and a tangent of the inner surface of the lining perpendicular to the axle center of the valve form the sliding angle 74($\phi$). A contact surface where the small rounded corner of the corner 923a of the ribbon sealing butterfly disc 92b is in contact with the lining deformation 68($\delta$) forms a sliding interface. The material of the inner surface 933 of the lining at the rear side of the butterfly disc outer rim 922 bears the tension. The inner surface 933 of the lining at the front side bears the friction force 75(F), and the material is pressed to make a protuberant lining deformation 68($\delta$). Because the friction force 75(F) is given, the outer rim of the metallic butterfly disc 92c stretches and presses the fluoroplastic encapsulation 69, and the encapsulation deformation 69a is generated. Generally, the conventional technique leaves linking holes 513 on the metallic butterfly disc 92c to reinforce the strength of the structure of the fluoroplastic encapsulation 69, thereby prolonging the service life, not shown.

FIG. 9E shows the interference sliding 7 of the linear sealing 61 along the line a-a during the closing process. The conical curved surface 924 provided with the sliding angle 74($\phi$) larger than that of the ribbon sealing slides forwards. In other words, the conical curved surface 924 of the butterfly disc outer rim 922 adds the friction force 75(F) to press against the inner surface 933 of the lining, so the pressed place becomes recessed, and the material is pushed to make a protrusion at the front side. Accordingly, the lining deformation 68($\delta$) is formed. The material at the rear side bears more tension. The outer rim of the metallic butterfly disc 92c adds more friction force 75(F) to the fluoroplastic encapsulation 69 to press and stretch, so more encapsulation deformations 69a are created. This causes the fluoroplastic encapsulation 69 to have a shorter service life.

Referring to FIGS. 8E and 9E, the butterfly disc 92 subjects the lining 93 to the interference sliding during the closing process and bears the friction torque 794(Tf) caused by the friction force 75(F) until it is fully closed. The static pressure torque 793(Tp) of the valve shaft is generated when the butterfly valve 9 is closed but the butterfly disc 92 is not completely closed at a right place. Because the piping static pressure is added to the butterfly disc flanks 921 on the two sides, a rotational direction 791 and a direction along which the pressure is added exist in the clockwise and the counterclockwise direction and thus the static pressure torque 793(Tp) is generated.

Please compare FIG. 8E with FIG. 9E. When the packing amount 65($\varepsilon$) is larger as shown in FIGS. 8B and 9B or the sliding angle 74($\phi$) is larger, a larger amount of material deformation is easily caused. When the contact angle 71($\theta$) of the ribbon sealing is larger, the sliding distance becomes longer, and more materials need to suffer the deformations and the risk of creep. Under the same packing amount 65($\varepsilon$), the larger sliding angle 74($\phi$) of the linear sealing 61 shows that a large amount of material deformation concentrate in a small area and creep in materials may be easily incurred, which however shortens the service life.

Problems related to the above conventional technique and meeting special specifications and demands are listed as follows:

Problem 1: Material deformation related to the lining deformation 68($\delta$) and the encapsulation deformation 69a. When the packing amount 65($\varepsilon$) is larger, the sealing capability is better and the resistance to the piping static pressure 82(Ps) is better. However, the creep is easily incurred and high torque is required. These conditions incur the creep easily, require high torque and are unfavorable to the interference sliding 7 while rotating, in particular the service life of the butterfly valve is shortened at high temperatures. The ribbon sealing 62 uses a larger sealing width 63(B), a smaller press pressure 64(p), and a lower packing amount 65($\varepsilon$) to attain a sealing effect capable of resisting high pressure and high temperatures. The linear sealing 61 uses a smaller sealing width 63(B), a higher press pressure 64(P), and a larger packing amount 65($\varepsilon$) to attain a sealing effect capable of resisting high pressure, but the creep is easily incurred and is unfavorable to the temperature resistance.

Problem 2: Interference sliding. The interference sliding 7 has a larger contact angle 71($\theta$), a longer sliding distance and more lining deformations 68($\delta$) at the portion of the ribbon sealing 62 along the cross-sectional line a-a. The portion along the line a-a is easily worn away and causes the creep, which increase the risk of leakage and reduce the service life of the butterfly valve. The portions of the linear sealing 61 along all of the cross-sectional lines have the smallest contact angle 71($\theta$) and the largest sliding angle 74($\phi$). Under high temperatures or large packing amount 65($\varepsilon$), both of the fluoroplastic encapsulation 69 and the inner surface 933 of the lining suffer relative more lining deformations 68($\delta$), encapsulation deformations 69a and friction forces 75(F), and this phenomenon shortens the service life of the fluoroplastic encapsulation 69 and the inner surface 933 of the lining. To solve this problem becomes the most important issue.

Problem 3: The shaft hole surface. The shaft hole surface 634 is coupled with and pressed against the shaft sealing surface 637 for sealing. When the shaft hole surface 634 has a larger sealing width 63(B), the sealing need is more fulfilled but more sliding friction is generated. It is an important issue to fulfill the function of rotating the butterfly disc 92 and prevent wear and creep caused by the sliding friction. It is also an issue about the sealing between the joint edge 633 of the sealing plane 632 and the side cutting edge 636 of the horizontal sealing end surface 635.

Problem 4: The flow passage 8, the structure of the butterfly disc 92, the annular surface structure of the butterfly disc outer rim 922 and the structure of the inner surface 933 of the lining. If the area of the flow passage 8 is reduced, the performance of the butterfly valve is decreased. The butterfly disc protrusion 927 of the diametral connection 929 occupies the larger area of the flow passage.

Problem 5: Fluid torque (Th) and Static pressure torque (Tp). When two slit passages 81 are formed between two sides of the butterfly disc flank 921 and the lining 93, the portion of the butterfly disc 92 along the cross-sectional line c-c bears the most fluid torque 792(Th) by reason of its longest rotary moment arm 73(R), bears the largest static pressure torque 793(Tp) while closing, and bears the most static pressure torque 793(Tp) when the smallest contact angle 71($\theta$) generated in the incorrect closed state leads to the greatest decrease in the packing amount 65($\varepsilon$). The design of the conventional technique is to increase the packing amount 65($\varepsilon$) of the portion along the cross-section line c-c in order to resist the static pressure torque, but this also increases the demand for the torque 79(T).

Problem 6: Resistance to high temperatures. The lining 93 uses the support of the valve body 91 to reduce the shrinkage of the tubular portion 931 subjected to high temperatures. The resistance to high pressure and high temperatures is due to a suitable packing amount 65($\varepsilon$) and a proper interference sliding 7 to thereby prevent the fluoroplastic material from losing its strength because of the creep. The back-up ring 94 requires the groove 912 to provide an additional expansion room capable of receiving the volume expansion at high temperatures. The ribbon sealing 62 has better temperature resistance and pressure resistance. The linear sealing 61 cannot provide the performance of the temperature resistance.

Problem 7: The strength of the butterfly disc 92. Using a thicker ribbon sealing butterfly disc 92b instead of the structure of the diametral connection 929 can not only improve the concentration of stresses in the center of the butterfly disc but also provides a higher strength and a better flow performance.

Various prior arts are listed in response to the above problems and special specifications and demands to detect the effectiveness thereof, as follows:

Reference 1:

A U.S. Pat. No. 3,376,014A published in the year 1968 disclosed a replaceable substantially rigid fluorocarbon resin valve unit for use in butterfly valves. The object of this reference is to produce a structure where the lining and the back-up ring can be replaceable. A symmetrical butterfly valve device includes a two-piece valve body, a fluoroplastic-encapsulated butterfly disc, and a lining and a back-up ring whose two tubular ends have flanges. The butterfly disc has a diametral connection having a relatively large thickness and shaft holes at two ends and is provided with high rigid. Butterfly disc flanks are formed in a thick and board-like structure. When the inner surface of the lining is cylindrical, the outer rim of the butterfly disc presses against the inner surface of the lining so that a ribbon sealing can be generated to have a sealing to the pressure limit of 200 psi, i.e. 200 psi. When the inner surface of the cylinder of the lining protrudes inwards to provide a trapezoidal cross section and a peripheral groove is formed at the middle position to receive the outer rim of the butterfly disc, a slotted ribbon sealing is generated to has a sealing to the pressure over 400 psi (>400 psi).

Reference 1 still has following problems:

Problem 1: Amount of material deformation. The sealing effect of the ribbon sealing is ≤200 psi, so the amount of material deformation is small and the pressure resistance is poor. The inner surface of the lining having the protuberant trapezoidal cross section and the groove has the sealing to the pressure over 400 psi, but a large amount of material deformation is incurred and the demand for the torque and the service life cannot be fulfilled.

Problem 2: Interference sliding. When the butterfly disc is open and closed, the contact angle between the outer rim and the inner surface of the lining with the protuberant trapezoidal cross section becomes smaller, and an interference sliding with a large amount of material deformation occurs on the outer rim and the inner surface of the lining with the protuberant trapezoidal cross section. Thus, the packing amount rises quickly and more torque is also needed.

Problem 3: The shaft hole surface. The measure is that an O-ring is added to the shaft sealing surface.

Problem 4: The flow passage. The inner surface of the lining with the protuberant trapezoidal cross section leads to a reduction in the area of the flow passage. There is a relatively large thickness of the butterfly disc protrusion and a corresponding reduction in the area of the flow passage.

Problem 5: Fluid torque and static pressure torque. No descriptions.

Problem 6: Resistance to high temperatures. The volume of the material of the protuberant trapezoidal cross section of the tubular portion is too big to prevent the shrinkage after it is subjected to high temperatures. The back-up ring cannot retain the strength of the structure at high temperatures, so the resistance to high temperatures is greatly decreased.

Problem 7: Strength of the butterfly disc. The radial connection and the butterfly disc protrusion are disposed, and there is also the thick and board-like cross section, thereby providing a high strength.

Reference 2:

A U.S. Pat. No. 3,447,780A published in the year 1969 disclosed a plastic resin lined butterfly valve with improved sealing arrangements. This reference was invented according to Reference 1. The disclosed lining is thicker, and the thickness of the material at the middle of the tubular portion is reduced to form a rectangular groove at the outer side, thereby receiving a back-up ring whose cross section is a rectangular rounded corner. When the outer rim of the butterfly disc presses against the inner surface of the lining with the reduced thickness, the inner surface of the lining to which the force is imparted can be fully supported by the back-up ring with high elasticity, and the material is neither stretched nor deformed. The pressed surface becomes a small-width linear sealing. The shaft sealing surface and the shaft hole surface also form grooves and a long O-ring whose two ends are formed in a wedge shape is used, thereby having the sealing to pressures up to 500 psi, namely ≤500 psi, at 400° F.

Reference 2 still has following problems:

Problem 1: Amount of material deformation-butterfly disc with a conical cross section. The butterfly disc outer rim of the butterfly disc has a conical curved surface to provide the linear sealing, which helps attain the sealing to pressures up to 500 psi, namely ≤500 psi, at 400° F. and fulfills the need for low torque. However, the material of the tubular portion has different thicknesses, the sealing surface uses a thin material structure, and the back-up ring is not fixed by the groove of the valve body. Because the descriptions are lacking, it is unable to determine whether the temperature at 400° F. and the long-term use of the structure with different thicknesses can fulfill the demand for the pressure resistance and the service life.

Problem 2: Interference sliding. The linear sealing has a small contact angle, so the large amount of material deformation is not caused and the demand for higher torque is not required when the interference sliding occurs during the opening operation and the closing operation.

Problem 3: The shaft hole surface. Annular grooves with a wedge-shaped cross section are respectively formed on the shaft sealing surfaces at two ends of the butterfly disc and the corresponding shaft hole surfaces of the lining in order to receive the fluoroplastic O-ring. The elliptical structure whose two ends are formed in a wedge shape has the sealing to pressures up to 500 psi, namely ≤500 psi, at 400° F., but the disclosed descriptions neither describes the connection between the linear sealing surface and the O-ring and the sealing mechanism in detail nor describes whether the service life can meet the demand, namely whether the butterfly disc could be rotated without getting worn.

Problem 4: The flow passage. The inner surface of the lining with the cylindrical cross section does not affect the performance, whereas the butterfly disc protrusion having the radial connection affects the performance.

Problem 5: Fluid torque and static pressure torque. No descriptions.

Problem 6: Resistance to high temperatures. The rectangular groove at the outer side of the tubular portion enlarges when the back-up ring expands or becomes deformed, so no support is added to the back-up ring and the strength of the ring cannot be retained.

Accordingly, the temperature resistance is greatly decreased at high temperatures.

Reference 3:

A U.S. Pat. No. 3,661,171A published in the year 1972 disclosed a butterfly valve. The object of this reference is to improve the sealing function when the butterfly valve is completely closed. A symmetrical butterfly valve device includes a two-piece valve body, a fluoroplastic-encapsulated butterfly disc, and a lining and a back-up ring whose two tubular ends have flanges. Two ends of the butterfly disc have protrusions and a valve shaft is disposed to thereby form a high rigid flat structure. An outer rim of the butterfly disc is used to construct a ribbon sealing. A groove is formed in an inner diametral surface of the valve body to receive the back-up ring. The width of the groove is slightly larger than the thickness of the outer rim of the butterfly disc. Two radial ribs projecting outwards and parallel to each other are disposed on an outer side of a cylinder. The back-up ring with a circular cross section can be installed between the two ribs and then mounted in the groove of the inner diametral surface of the valve body. However, the back-up ring provides the inner surface of the lining with a radial bulging portion of 0.036 inches formed at the middle portion, so a recessed area and a raised area are formed on the inner surface of the lining. Two sides of the cylinder each are 0.028 inches lower than the middle protruding portion. In other words, the middle portion of the cross section of the cylinder is minus 0.008 inches to thereby become recessed. When the butterfly disc outer rim presses against the inner surface of the lining, the back-up ring is flattened to render the inner surface of the lining flat. Accordingly, the friction of the interference sliding of the butterfly disc outer rim is reduced, so the torque is not increased and there is no wear when the butterfly disc is rotating. This reference made further modifications that the butterfly disc outer rim is shaped into a conical curved surface to make a linear sealing, so the material of the lining can take lesser stretching tension to decrease the occurrence of the creep and the friction and have a reduction in the demand for torque which helps prolong the service life of the butterfly valve.

Reference 3 still has following problems:

Problem 1: Amount of material deformation. The inner surface of the cylindrical lining uses the back-up ring to make protrusions whereby the original ribbon sealing attains a sealing effect similar to the linear sealing. However, the sealing width and the packing amount are still limited by the size of the O-ring. In terms of the rubber O-ring whose diameter is 10 mm in cross section, the adopted packing amount is about 0.036 inches (0.91 mm) and the calculated compression ratio, smaller than 10 percent (<10%), seems to be too low. No documentary reference can be used to support the effectiveness. When the butterfly disc outer rim is formed into a conical curved surface, the pressed area is reduced and the pressure resistance is also decreased while making the linear sealing.

Problem 2: Interference sliding. The inner surface of the lining has a micro recessed structure of 0.008 inches and a protrusion of 0.036 inches formed at the middle portion to fulfill a design analogous to the linear sealing. The contact angle formed while rotating the butterfly disc is smaller and the demand for the torque is reduced. These two conditions reduce the friction of the interference sliding between the butterfly disc and the lining. On the outer side of the cylinder of the lining are disposed two radial and parallel projecting ribs which reduce the material deformation of the inner surface of the lining caused by the interference sliding and help prolong the service life.

Problem 3: The shaft hole surface. An O-ring structure is added to the back-up ring and a cup member is additionally added to increase the sealing of the shaft hole surface.

Problem 4: The flow passage. The inner surface of the lining has a protrusion of 0.036 inches supported by the back-up ring. The effects caused by the reduction in the area of the flow passage are not obvious. The butterfly disc protrusion located at the shaft end does not occupy the area of the flow passage extensively, and the butterfly disc having a flat cross section does not affect the performance.

Problem 5: Fluid torque and static pressure torque. No descriptions.

Problem 6: Resistance to high temperatures. When the silicone rubber back-up ring is adopted at high temperatures, there can be an expansion room. Two parallel and radial ribs formed at the outer rim of the cylinder of the lining can retain the resistance to high temperatures.

Problem 7: Strength of the butterfly disc. The disclosed structure has the butterfly disc protrusion and its butterfly disc has a flat cross section, so the stress can be concentrated in the middle portion. This is suitable for a small and medium butterfly valve.

Reference 4:

A Japanese patent publication no. JPH1078143A published in the year 1998 disclosed a seat ring for butterfly valve. This reference was invented by referring to two prior arts, namely a Japanese patent publication no. JPS54103645U published in the year 1979 disclosed a butterfly valve and a Japanese patent publication no. JPS55142169A published in the year 1980 disclosed a seat ring for butterfly valve. The object of this reference is to increase the controllability of the flow linearity of the low flow amount while opening the valve by a low degree and provide the butterfly disc with the requisite annular lining to fulfill the condition that the butterfly disc outer rim can press against two curved surfaces of the inner surface of the lining while rotating. This reference discloses a butterfly valve with a rubber lining for a general use under the room temperature. The rubber has high deformation amount and high elasticity but does not have the resistance to corrosion and the resistance to high temperatures. The butterfly disc uses a metallic plate and the butterfly disc outer rim with a conical curved surface can provide a linear sealing. The way to solve the problems and related descriptions can still clarify the answers responsive to questions 1 to 7 and can also explain why the prior arts of this reference cannot fulfill the need for the use of the fluoroplastic lining with higher hardness and strength under high temperatures and high pressure. The inner surface of the lining of this reference is a curved surface which protrudes inwards and is an annular structure having a mountain-shaped cross section, hereinafter referred to as mountain structure. An apex of the mountain structure is annularly distributed over an inner surface of a lining along a central axis of a shaft hole surface of the lining. The mountain structure is divided into two semicircular portions by two shaft holes. Two shaft hole surfaces allows shaft sealing surfaces of the butterfly disc outer rim to have a press sealing operation. The cross section of the mountain structure uses the central axis of the shaft hole surface as a center and forms two-section symmetrical curves to thereby construct two-section slopes on two sides of the mountain structure. The mountain structure has different widths at different circumferential angles. In other words, two-section curves have different lengths. The shaft hole end of the mountain structure along a cross-sectional line a-a has a smaller width, whereas the portion thereof away from the shaft hole end along a cross-sectional line c-c has a larger width. Margins of the two-section slopes are parallel to each other. This mountain structure is applied to increase the strength of the structure of the rubber lining. When the valve is closed, the butterfly disc presses against the two-section slope of the inner surface of the lining. This means that the contact angles of the butterfly disc outer rim and the inner surface of the lining are greatly decreased and are approximately the same. The friction length of the interference sliding is largely reduced to reduce the demand for the torque and prolong the service life of the butterfly valve. Other prior arts such as a Taiwanese patent no. TW496934B published in the year 2002 showing a butterfly valve and thin plate ring and a Japanese patent publication no. JP2003014139A published in the year 2003 showing a butterfly valve were disclosed to improve the projecting annular structure whose inner surface of the lining has an asymmetrical trapezoidal cross section whereby the sealing effect of the valve is promoted and the need for the torque is reduced. These prior arts can be deemed as further modifications of this reference. However, it is obvious that such rubber material structure cannot be adapted to the fluoroplastic material. Its problems are described as follows:

Problem 1: Amount of material deformation. The butterfly disc can make a large amount of material deformation in a small area. The rubber lining allows the linear sealing with the large amount of material deformation. The structure with the mountain-shaped cross section provides sufficient strength. If the fluoroplastic is used to make this mountain structure, the creep having the large amount of material deformation in the small area cannot be taken. When the butterfly disc outer rim encapsulated by the fluoroplastic presses, a narrow metallic arc surface has the creep caused by the press sealing when the fluoroplastic encapsulation acts by pressing. This situation causes the encapsulation of the butterfly disc to be ineffective and leads to the infiltration of corrosive liquid.

Problem 2: Interference sliding. When the butterfly disc makes a linear sealing, the contact angle is relatively smaller, and the mountain structure of the inner surface of the lining has a smaller width at the shaft hole end along the line a-a and has a steeper curved surface. Accordingly, the packing amount rises shapely and a high amount of deformation and large friction forces are generated. In terms of the fluoroplastic lining, the interference sliding of the butterfly disc must be carried out at the shaft hole end where the steeper curved surface is provided. The fluoroplastic cannot bear the large amount of material deformation in the small area and high friction forces. The risk of leakage near the valve shaft is large and the service life of the butterfly valve is reduced. The fluoroplastic-encapsulated butterfly disc and the fluoroplastic of the inner surface of the lining suffer high material deformation and the creep, and this situation causes the encapsulation of the butterfly disc to be ineffective and incurs the infiltration of the corrosive liquid.

Problem 3: The shaft hole surface. The shaft sealing surface of the butterfly disc outer rim has an extensive interference press sealing at the shaft hole surface, and the rubber material does not result in the wear and the creep caused by the friction of the interference sliding at the time of rotating the butterfly disc. The fluoroplastic lining needs to design additional shaft sealing surfaces and shaft hole surfaces because the extensive press causes the press surfaces of the fluoroplastic to experience the creep and have wear because of the friction, with the result that the leakage is incurred and the service life of the butterfly valve is reduced.

Problem 4: The flow passage. The inner surface of the lining is a mountain structure, and this structure reduces the area of the flow passage and results in the reduction in the performance of the butterfly valve. The metallic material has a butterfly disc protrusion with a radial connection, and this design occupies the area of the flow area.

Problem 5: Fluid torque and static pressure torque. No descriptions.

Problem 6: Resistance to high temperatures. Generally, the rubber material lacks good resistance to high temperatures. The volume of the material of the fluoroplastic with the projecting trapezoidal cross section is too big, so the strength of the structure cannot be retained under high temperatures and the temperature resistance is greatly decreased.

Problem 7: Strength of the butterfly disc. The diametral connection and the butterfly disc protrusion are disposed, and there is also the conical cross section, thereby providing a high strength.

Reference 5:

A Japanese patent publication no. JP2003166654A published in the year 2003 disclosed a butterfly valve. The object of this reference is to provide a butterfly valve which has a good sealing effect at high temperatures and room temperature, and the required torque is not increased when the back-up ring is expanded by high temperatures. The measure is that this reference provides volume distribution troughs on the inner peripheral surface of the valve body to allow the back-up ring made of rubber to be expanded at high temperatures, thereby reducing the press force added to the fluoroplastic inner surface of the lining. When the butterfly disc makes the linear sealing and the butterfly disc outer rim provides an interference sliding and friction against the inner surface of the lining, the interference amount of the volume is smaller and the torque is not increased.

Problem 1: Amount of material deformation. When the butterfly disc encapsulated by fluoroplastic makes the linear sealing, the creep problem caused by the press sealing and resulting in the large amount of material deformation is not easily incurred. However, the resistance to high pressure cannot be attained.

Problem 2: Interference sliding. When the butterfly disc encapsulated by fluoroplastic makes the linear sealing, the contact angle becomes smaller. A protuberant slope is formed on the rubber back-up ring, so the area for conducting the interference sliding between the butterfly disc and the inner surface of the lining is smaller and there is a low demand for the friction torque. The narrow metallic arc adds smaller tension or shear forces to the encapsulated fluoroplastic. This also does not cause the encapsulated fluoroplastic of the thin butterfly disc to be ineffective.

Problem 3: The shaft hole surface. No further descriptions.

Problem 4: The flow passage. A projecting slope is formed on the rubber back-up ring. When the inner surface of the lining projects inwards slightly, the performance of the butterfly valve is not decreased. The area of the flow passage occupied by the butterfly disc protrusion and the radial connection is large, and this arrangement affects the performance.

Problem 5: Fluid torque and static pressure torque. No descriptions.

Problem 6: Resistance to high temperatures. Volume distribution troughs formed on the inner peripheral surface of the valve body are provided. This arrangement allows the back-up ring made of rubber to be expanded at high temperatures to thereby reduce the press force added to the inner surface of the fluoroplastic lining. However, the sealing performance of the linear sealing is decreased under high temperatures.

Problem 7: Strength of the butterfly disc. The diametral connection and the butterfly disc protrusion are disposed, and there is also the conical cross section, thereby providing a high strength.

Reference 6:

A Japanese patent publication no. JP2012219819A published in the year 2012 disclosed an airtight structure of butterfly valve. The object of this reference is to improve the sealing capability of the butterfly valve and relates particularly to a structure which makes an annular recessed spherical surface at the middle portion of the inner surface of the lining and a shaft hole surface connected to the spherical recessed surface. The disclosed structure allows the butterfly disc outer rim to provide a surrounding effective ribbon sealing, thereby increasing the sealing effect of the valve and decreasing the need for the torque. After the comparison and analysis, the press deformation can be evenly generated to attain an effective sealing effect.

Problem 1: Amount of material deformation. When the butterfly disc makes the ribbon sealing, the annular recessed spherical structure with a small area is used to generate a sealing effect where a larger press area is caused by the butterfly disc outer rim but only a little amount of volume deformation is incurred. The creep problem caused by the press sealing and resulting in the large amount of material deformation is not easily incurred. The pressure resistance is attained.

Problem 2: Interference sliding. The thickness of the butterfly disc encapsulated by fluoroplastic is larger, so the annular recessed spherical surface is used to reduce the contact angle while doing the ribbon sealing. Further, the material only provides the less packing amount during the interference sliding operation with friction, which requires a low demand for the torque. Only a small amount of the volume is subjected to the interference friction, and the tension and shear forces which the thin-layered fluoroplastic of the recessed spherical surface suffer are smaller. The service life of the thin-layered fluoroplastic of the recessed spherical surface is longer. When the butterfly disc outer rim encapsulated by the fluoroplastic makes the interference sliding by friction, the inner metallic corner of the butterfly disc adds less tension or shear forces to the encapsulated fluoroplastic and no creep impinges on the encapsulated fluoroplastic.

Problem 3: The shaft hole surface. The original spherical surface is retained, but the contact in the extensive area still has wear.

Problem 4: The flow passage. A small annular recessed spherical surface is formed in the middle of the inner surface of the lining, so the area of the flow passage is not reduced and the performance of the butterfly valve is not decreased. The area of the flow passage occupied by the butterfly disc protrusion formed at two shaft ends is not large. The butterfly disc having a thick plate in cross section does not affect the performance.

Problem 5: Fluid torque and static pressure torque. No descriptions.

Problem 6: Resistance to high temperatures. A small annular recessed spherical surface is formed in the middle of the inner surface of the lining, so the recessed portion of the inner surface of the lining has a smaller thickness. The smaller thickness results in the material deformation easily and causes the inner surface of the lining to shrink inwards easily at high temperatures. The inward shrinkage of the recessed spherical surface at high temperatures affects the temperature resistance, but the expansion of the rubber of the back-up ring incurred by high temperatures also results in an outward protrusion of the recessed spherical surface, which however decreases the temperature resistance.

Problem 7: Strength of the butterfly disc. The butterfly disc protrusion and the board-like cross section are disposed. The thickness which decides the strength of the butterfly disc provides a small and medium butterfly disc with a high-strength structure.

Reference 7:

A Chinese patent publication no. CN204344951U published in the year 2015 disclosed a high-precision and corrosion-resistance butterfly valve. The object of this reference is to provide the inner surface of the lining with a recessed spherical structure, hereinafter referred to as recessed spherical surface, thereby improving the sealing effect of the valve and reduce the demand for the torque. The material of the lining of the valve is fluoroplastic, and the material of the butterfly disc is also fluoroplastic. The reference does not disclose whether the metallic butterfly disc is encapsulated by fluoroplastic. From the disclosed drawing, it can be determined that the butterfly disc can make a linear sealing, and the rubber back-up ring is installed in the inner recess of the valve body to increase the sealing capability of the recessed spherical surface.

Problem 1: Amount of material deformation. If the fluoroplastic is used to make such recessed spherical surface, the sealing effect is involved in a small area of deformation, and no creep resulting in the large amount of material deformation is incurred when the fluoroplastic-encapsulated butterfly disc makes the linear sealing. However, the structure cannot provide the resistance to high pressure.

Problem 2: Interference sliding. When the butterfly disc makes the linear sealing, the contact angle is small and a smaller area is provided for conducting the interference sliding during the rotation of the butterfly disc. The friction is small and the demand for the torque is low. The thin-layered fluoroplastic of the recessed spherical surface suffers the tension and shear forces without being fixed by the rubber of the back-up ring. The thin-layered fluoroplastic of the recessed spherical surface creases easily, becomes abraded and causes the infiltration of the corrosive liquid.

Problem 3: The shaft hole surface. The original spherical surface is retained. No further descriptions.

Problem 4: The flow passage. The inner surface of the lining is a recessed spherical surface, so the effective area of the flow passage is reduced and the performance of the butterfly valve is decreased Problem 5: Fluid torque and static pressure torque. No descriptions.

Problem 6: Resistance to high temperatures. The inner surface of the lining is a recessed spherical surface, which means that the cross section of the inner surface of the lining is extended to attain a straight length in a direction of the flow passage. The length is longer than the width of the valve body. The recessed spherical surface shrinks inwards at high temperatures and the structure of the recessed spherical surface is not retained by the back-up ring. Furthermore, the rubber of the back-up ring expands towards the spherical center under high temperatures. Thus, the temperature resistance is greatly decreased Problem 7: Strength of the butterfly disc. A protrusion disc protrusion and a conical cross section are disposed to provide the resistance to high temperatures and high pressure.

Reference 8:

A Japanese patent publication no. JP2016041967A published in the year 2016 disclosed a valve body of butterfly valve and the butterfly valve. This reference was invented by referring to two prior arts, namely a Japanese patent publication no. JP2004239343 published in the year 2004 disclosed a valve element of butterfly valve and a Japanese patent publication no. JP2007032683A published in the year 2007 disclosed a butterfly valve. This reference is adapted to a metallic butterfly disc, and the means of this reference is also adapted to a fluoroplastic-encapsulated butterfly disc. The object of this reference is to improve the weight and flow resistance of the butterfly valve and reduce the torque. The disclosure reduces the weight of the butterfly disc structure without decreasing the strength of the butterfly disc, and the sealing and the fluid flow still retain high performance. When the butterfly disc is closed, the butterfly disc has the sufficient strength to bear the pressure of the piping and prevents the deformation and the ineffectiveness of the sealing operation. When the butterfly disc is open, the butterfly disc in the flow passage of the piping does not reduce the area of the flow passage obviously, and the butterfly disc does not cause an increase in the flow resistance because of the turbulent flows of fluid and the cavitation. The butterfly disc structure of this reference has a diametral connection and a butterfly disc protrusion in a vertical direction to provide the structure with rigidity and also has a rib plate with an elliptical cross section in a horizontal direction. Near the butterfly disc outer rim is disposed an annular structure whose thickness is one time the thickness of the butterfly disc to thereby enhance the strength of the structure of the butterfly disc flanks.

Problem 1: Amount of material deformation. When the butterfly disc makes the linear sealing, the thickness of the outer diametral side of the metallic plate of the butterfly disc is 2.5 mm. This reference does not disclose the conditions of the inner surface of the lining. When the fluoroplastic lining is used, the width of the press surface is only 2.5 mm and this condition does not provide the resistance to high temperatures and high pressure.

Problem 2: Interference sliding. This reference does not disclose the conditions of the inner surface of the lining. Basically, the linear sealing can attain low deformation and low torque. If it is applied in the butterfly disc having the fluoroplastic encapsulation, the interference sliding results in the material deformation of the fluoroplastic encapsulation and the creep under a high packing amount. Thus, the temperature resistance and the pressure resistance cannot be attained.

Problem 3: The shaft hole surface. The shaft sealing surface is a spherical curved surface.

Problem 4: The flow passage. The area of the flow passage occupied by the diametral connection and the butterfly disc protrusion is large. Although the rib plate with an elliptical cross section in the horizontal direction occupies the area of the flow passage, there is still a decrease in the turbulent flows of the flow passage.

Problem 5: Fluid torque and static pressure torque. The decrease in the turbulent flows and the reduction in the cavitation can reduce the fluid torque.

Problem 6: Resistance to high temperatures. There is a linear sealing, and the temperature resistance cannot be raised.

Problem 7: Strength of the butterfly disc. The diametral connection and the butterfly disc protrusion are disposed, and the thickness of the board-like cross section is only 2.5 mm. The butterfly disc flank also has a rib plate with an elliptical cross section in a horizontal direction, and near the butterfly disc outer rim is disposed an annular structure whose thickness is one time the thickness of the butterfly disc to thereby provide the sufficient strength.

Reference 9:

A Chinese patent application publication no. CN106415087A published in the year 2017 disclosed a seal structure for butterfly valve. The object of this reference is to provide a butterfly valve which has a good sealing effect at high temperatures and room temperature, and the required torque is not increased when the back-up ring is expanded by high temperatures. A sealing structure of the butterfly valve includes a lining made of resin and disposed on an inner peripheral surface of the valve body. The lining has shaft holes formed at opposite positions in a diametral direction, including shaft holes and shaft hole surfaces. The butterfly disc has a butterfly disc protrusion capable of passing the lining and the rubber back-up ring and installed in a shaft hole portion of the valve body. A valve shaft is installed on a central hole of the butterfly disc protrusion. When the valve shaft rotates, the butterfly disc outer rim presses against the inner surface of the lining. It is characterized in that an inner diameter of the lining of the valve body is set as follows: When the valve is open, the inner diameter of the inner surface of the lining is deformed by an elastic force of the rubber back-up ring and becomes an inner diameter smaller than an outer diameter of the butterfly disc. On the other hand, when the valve is closed, the butterfly disc pushes and presses and the inner diameter is recovered to the original non-deformed state because of the elastic force of the rubber back-up ring. The non-deformed inner diameter includes the tolerance and is equal to or slightly larger than the outer diameter of the butterfly disc.

Problem 1: Amount of material deformation. The thickness of an outer diametral side of the metallic plate of the butterfly disc is 3 mm. The fluoroplastic-encapsulated butterfly disc makes the linear sealing, and the compressed inner diameter of the inner surface of the lining approaches an original diameter which is not compressed by the rubber back-up ring and also approaches the outer diameter of the butterfly disc. In other words, the inner surface of the lining is not pressed by the butterfly disc outer rim and thus is not extended. In this reference, the disclosed compression ratio is about 13 percent (13)%, 1.3 mm/10 mm. The object is to reduce the creep which results in the large amount of material deformation while press sealing and seek a linear sealing and a low packing amount at about 13 percent (13%) for reducing torque by about 23 percent (23%). However, the width of the press surface is only 3 mm, so the pressure resistance and the temperature resistance cannot be provided.

Problem 2: Interference sliding. The linear sealing is only conducted between the butterfly disc outer rim and the annular sealing surface bulging at the middle of the inner surface of the lining, so the contact angle is smaller and the demand for the torque is low. The butterfly disc outer rim adds friction of interference sliding to the inner surface of the lining in a smaller area. The packing amount is about 13 percent (13%). The smaller tension or shear forces added to the inner surface of the lining can reduce torque by 23 percent (23%). An external arc surface of the inner metallic plate of the butterfly disc, which is 3 mm in thickness, adds the smaller tension or shear forces to the encapsulated fluoroplastic, and in the same way as the prior technique, the strength of the encapsulated fluoroplastic is increased when a portion of the metallic plate of the butterfly disc near the outer diametral side has through holes formed thereon, and this design does not result in the ineffectiveness of the encapsulation of the butterfly disc.

Problem 3: The shaft hole surface. Respective protrusion seats are disposed on back sides at two ends of the shaft hole to enhance the sealing performance of the shaft hole surface and are connected to the inner surface of the lining.

Problem 4: The flow passage. The annular sealing surface bulging at the middle of the inner surface of the lining decreases the area of the flow passage by about 5 percent (5%). The butterfly disc protrusion is only disposed at two shaft ends, with the result that the area of the flow passage occupied by the protrusion is not large. The butterfly disc has a conical cross section, so the performance is not affected.

Problem 5: Fluid torque and static pressure torque. No descriptions.

Problem 6: Resistance to high temperatures. The rubber back-up ring provides the support to the sealing surface bulging at the middle on the inner surface of the lining to allow the expansion of the rubber back-up ring to meet the room between the lining and the valve body under high temperatures. The undue press added to the tubular portion of the fluoroplastic lining can be reduced, but the temperature resistance is still not raised because of the linear sealing.

Problem 7: Strength of the butterfly disc. The butterfly disc protrusion and the conical cross section provide the structure with high strength.

Reference 10:

A Chinese patent publication no. CN100376828C published in the year 2008 disclosed a valve body of miter valve. The object of this reference is to prevent the reduction in the flow coefficient Cv when the valve is fully open, reduce the fluid resistance at a full opening degree and at a middle opening degree, and attain a lighter valve body. Table 1 of this reference discloses the flow coefficient Cv.

Reference 11:

A product catalogue numbered by "Tomoe Valves USA catalog-846t-847t-847q-20150601" was published by Tomoe Valves Co., Ltd. This reference is one of the product catalogues of this company. This product catalogue provided a table showing the flow coefficient Cv of the fluoroplastic butterfly valve. The flow coefficient Cv is referred to the butterfly valve whose caliber is 3 inches.

According to the above discussions about the structures of the references and their problems 1 to 7, we can observe that in the temperature up to 200° C., namely ≤200° C., the sealing width and the material deformation caused by the interference sliding lack full solutions and do not fulfill the demand for temperature resistance and the pressure resistance. It also needs to more clarify the performance of the structure related to the low torque, the high flow amount, the high Cv value, the long service life, the high reliability, etc. Therefore, the current conventional approaches of the fluoroplastic lining butterfly valve cannot fulfill the specifications of the butterfly valve adapted to special purposes, shown as follows:

Corrosive liquid: transport fluid, such as hydrofluoric acid, hydrochloric acid and sulfuric acid. The thickness includes the tolerance of corrosion.

Performance and quality: high flow amount, low torque, long service life, resistance to high temperatures and high pressure, and high reliability.

Highest temperature: special purpose ≤200° C.

Highest pressure: special purpose ≤3 kg@200° C.

SUMMARY OF THIS INVENTION

To fulfill the above needs, this invention provides a butterfly disc and a valve body which use a complex sealing means to improve the sealing width of the butterfly disc and the valve body at high temperatures, overcome shortcomings of the interference sliding, and retain high performance. This novel invention aims at a butterfly valve structure which provides improvements in the sealing and pressure resistant capability, the reduction in torque, the temperature resistant capability and the performance of the valve.

A fluoroplastic butterfly valve structure includes a valve body, a butterfly disc, a lining, and a back-up ring.

The valve body is formed in a circular ring shape and is horizontally divided into a semicircular-shaped two-piece part, namely an upper valve body and a lower valve body. Two fasteners fasten the two valve bodies together to become united. The upper valve body and the lower valve body are installed in an axial direction. The upper valve body has a fastening portion and a shaft hole portion disposed thereon, and the lower valve has a fastening portion and a shaft hole portion disposed thereon. An inner peripheral surface of the valve body is formed to allow an installation of the fluoroplastic lining. The inner peripheral surface of the valve body is recessed inwards to form a groove with a trapezoidal cross section which defines an included angle ($\gamma$). The groove serves to receive the back-up ring having a trapezoidal cross section and defining an included angle ($\alpha$). A projecting ring is disposed on a bottom of the groove. A projecting height (s2) of the projecting ring is smaller than a groove depth (s1) of the groove. A projecting width (t2) of the projecting ring ranges from 1.5 to 2 times a thickness (t1) of an inner metallic butterfly disc of the butterfly disc but is smaller than a bottom width (t3) of the groove.

The lining, disposed in correspondence with the valve body, is also formed in a circular ring shape. The lining has an inner diametral side and an outer diametral side. Two ends of the lining each include a radial flange. The lining includes a tubular portion, and two axial ends of the lining each are formed with a horizontal sealing plane. The tubular portion and the horizontal sealing plane are connected to become a circular ring. The horizontal sealing planes are all flat surfaces on the inner diametral side and the outer diametral side. A vertical distance between two horizontal sealing planes is smaller than an inner diameter of the tubular portion. A thickness of the horizontal sealing plane is larger than a thickness of the tubular portion. The thickness covers the inner diametral side and the outer diametral side of the lining. An inner diametral side of the horizontal sealing plane and an inner diametral side of the tubular portion are connected at a place where an arc-shaped joint edge is formed. A shaft hole is formed on the horizontal sealing plane, and the inner diametral side and an outer diametral side of the horizontal sealing plane each form a shaft hole surface. The shaft hole surface is formed on an outer periphery of the shaft hole for press sealing. A sealing recess is formed on the shaft hole surface and located on the inner diametral side. The shaft hole surface, the joint edge and an inner surface of the lining located on the inner diametral side of the tubular portion are connected to construct a full sealing surface. When the butterfly valve is closed, a butterfly disc outer rim of the butterfly disc presses against the inner surface of the lining of the tubular portion supported by the valve body and the back-up ring to close the flow of fluid and bear the fluid pressure and temperature. On the outer diametral side of the horizontal sealing plane are respectively formed reinforcement portions which are located on two sides of the shaft hole along the tubular portion. A width of the reinforcement portion exceeds two times a thickness of an inner metallic butterfly disc of the butterfly disc, thereby allowing smooth variations in the thicknesses of the horizontal sealing plane and the tubular portion to solve the leakage of the joint edge.

The back-up ring is an elastic body made of rubber and is installed between the groove of the inner peripheral surface of the valve body and the tubular portion of the lining. An inner diameter of the back-up ring is basically equal to an inner diameter of the valve body. An outer diameter of the tubular portion is basically equal to the inner diameter of the valve body. The inner diameter of the back-up ring and the inner surface of the lining become smaller and protrude inwards because of shrinkage during the manufacturing process. These arrangements need a process control whereby a swelling height which protrudes is set within a reasonable range, and these protrusions need to be controlled and included in the calculation of a packing amount ($\epsilon$) when being made.

The butterfly disc is formed in a disc-like shape. Two axial ends of the butterfly disc outer rim each form a horizontal sealing end surface. The horizontal sealing end surface is formed in correspondence with the horizontal sealing plane of the lining. The horizontal sealing end surface and an annular curved surface of the butterfly disc outer rim are connected at a place where an arc-shaped side cutting edge is formed. The side cutting edge is formed in correspondence with the joint edge of the horizontal sealing plane for sealing. The horizontal sealing end surface and the horizontal sealing plane are axially and perpendicularly pressed against each other for sealing. The sealing between the side cutting edge and the joint edge is changed from a vertical sealing to a radial sealing. Because the reinforcement portion smoothens the thickness, the tight press is even and no leakage related to pressure resistance is incurred. Respective bulging portions and valve shafts are disposed on the two horizontal sealing end surfaces. The valve shaft and the bulging portion are concentric. The valve shaft has a long valve shaft and a short valve shaft. The valve shaft passes two shaft holes of the lining and is installed in the shaft hole portion of the valve body, so the butterfly disc can rotate to adjust the flow amount or open and close the valve. An outer diameter of the butterfly disc is slightly larger than an inner diameter of the inner surface of the lining. The bulging portions at the two ends divide the butterfly disc into two butterfly disc flanks, the cross section of which can be aboard-like cross section or a cone-like cross section. For example, the butterfly disc is 3 inches, and a thickness of an outer rim of the butterfly disc flank can provide a ribbon sealing with a sealing width larger than or equal to 4 mm, namely ≥4 mm.

When the butterfly disc is closed, the butterfly disc outer rim presses against the inner surface of the lining to attain a partial sealing surface. A compression ratio of the partial sealing surface is a number of the packing amount compared to a thickness of the back-up ring. According to the adopted material of the back-up ring and the demand for pressure resistance and temperature resistance, the compression ratio ranges from 15 percent (15%) to 20 percent (20%). The tubular portion of the lining stretches while being subjected forces and adds pressure to the back-up ring, and then an outer diameter of the pressed part of the tubular portion is larger than the inner diameter of the valve body. When the butterfly disc is open, the elasticity of the back-up ring causes the tubular portion to retract inwards so that the outer diameter of the tubular portion is approximately equal to the inner diameter of the valve body.

A shaft sealing surface and a protuberant sealing ring are disposed on the bulging portion. The sealing ring and the sealing recess of the shaft hole surface of the lining can be pressed against each other by interference fit to reduce an outer diameter of a butterfly disc protrusion. When the annular curved surface of the butterfly disc outer rim presses against the inner surface of the lining of the tubular portion, the annular curved surface and the shaft sealing surface can press against the shaft hole surface and the side cutting edge can press against the joint edge in order to form a continuously reliable sealing surface and reduce the wear and the creep caused by friction of the interference sliding under the rotation of the butterfly disc. Therefore, the sealing surface is a closed surface comprised of the inner surface of the lining, the joint edge and the shaft hole surface and is also a closed surface comprised of the annular curved surface, the side cutting edge and the shaft sealing surface.

This invention provides a fluoroplastic butterfly disc valve structure which has the resistance to high temperatures and high pressure and meets the demand for a low torque and a good service life. The annular curved surface of the butterfly disc outer rim includes an unequal-width conical surface and an unequal-width curved surface. A portion of the unequal-width conical surface near the valve shaft has a smaller sealing width, while a portion thereof near a middle portion of the butterfly disc has a largest sealing width. The sealing width of the portion of the unequal-width conical surface near the valve shaft exceeds 50 percent (50%) of the thickness of the outer rim of the inner metallic butterfly disc of the butterfly disc. For example, a butterfly disc which is 3 inches is adopted, and the sealing width of the butterfly disc is over 4 mm. The portion of the unequal-width curved surface near the middle portion of the butterfly disc has a largest sealing width, and the sealing width thereof exceeds 70 percent (70%) of the thickness of the outer rim of the metallic butterfly disc. Therefore, this invention provides more demands for the resistance to static pressure torque and high pressure airtight performance than the conventional technique does under a reasonable packing amount. The unequal-width curved surface extends from a superficial face of the butterfly disc flank to the outer rim. A portion of the unequal-width curved surface near the valve shaft has a longest smooth arc, while a portion thereof near the middle portion of the butterfly disc has a shortest smooth arc to replace the corner of the butterfly disc of the conventional ribbon sealing. The unequal-width curved surface is disposed in a closing direction of the butterfly disc. The unequal-width curved surface slide relative to the inner surface of the lining by a smaller contact angle 71($\theta$) and a sliding angle 74($\phi$) to decrease the material deformation and friction forces and reduce the contact angle and the sliding length greatly. The outer rim of the inner metallic butterfly disc of the butterfly disc also has a corresponding curved surface structure, an unequal-width conical surface and an unequal-width curved surface. When the valve is closed, the unequal-width conical surface of the butterfly disc outer rim and the inner surface of the lining are pressed against each other to generate a complex sealing, including the press fit between the shaft hole surface and the shaft sealing surface, the sealing between the protuberant sealing ring and the sealing recess, and the tight fit between the joint edge and the side cutting edge. These continuous tight press surfaces construct the complex sealing.

The advantages of this invention are described as follows:

Problem 1: Amount of material deformation. The unequal-width conical surface of the complex sealing can seek a larger sealing width and reasonable pressure of the press fit to attain the sealing effect and can use a more suitable compression ratio to satisfy the sealing demand. The material of the inner surface of the lining has less deformation and the creep is not easily incurred. The use of the larger sealing width means high pressure resistance whereby more variations in pressures can be endured. The large area of the material can be supported under high temperatures, and the temperature resistance can be increased. These advantages help prolong the service life of the butterfly valve.

Problem 2: Interference sliding. The unequal-width curved surface of the complex sealing replaces the conventional corner. The contact angle supplied by the unequal-width curved surface becomes smaller and the sliding length becomes shorter to thereby execute a relative smooth interference sliding action. The stretching tension and the shear forces which the material of the inner surface of the lining suffers are decreased, so the creep of materials is not easily incurred and the friction force is also decreased. The demand for the torque can be reduced, the pressure resistance of the butterfly valve and its resistance to high temperatures can be increased, and the service life of the butterfly valve can be prolonged.

Problem 3: The shaft hole surface. The protuberant sealing ring is disposed on the shaft sealing surface of the horizontal sealing end surface and capable of pressing against the sealing recess of the shaft hole surface of the horizontal sealing plane by interference fit, thereby reducing the area of the press sealing. The outer diameter of the butterfly disc protrusion can be reduced to increase the area of the flow passage, and the wear and the creep caused by the sliding friction can also be reduced to lower the risk of leakage and prolong the service life of the butterfly valve. Two sides of the shaft hole each form a reinforcement portion to smooth the variation in the thicknesses of the horizontal sealing plane and the tubular portion whereby the sealing capability of the horizontal sealing plane can be promoted.

Problem 4: The flow passage. When the butterfly disc is open to form a slit passage, the unequal-width curved surface enlarges the width of the slit passage, and the butterfly disc outer rim becomes a smooth curved surface to assist the butterfly disc in increasing the flow amount at a small open angle. The butterfly disc does not have a diametral connection, so the area of the flow passage is not extensively occupied. The butterfly disc flank uses aboard-like cross section or a cone-like cross section, and the separate bulging portions with a smaller outer diameter on two sides of the valve shaft of the butterfly disc fill a smaller area of the flow passage. An inner diametral surface of the lining is cylindrical and is equal to the inner diameter of the piping to ensure that the area of the flow passage and the flow amount are sufficient.

Problem 5: Fluid torque and static pressure torque. A slit passage is formed between the butterfly disc flank and the inner surface of the lining. The unequal-width curved surface enlarges the width of the slit passage to provide more flow amount and reduce separation flows and turbulent flows which render the fluid torque lower. The smallest sealing width of the portion of the unequal-width conical surface near the valve shaft exceeds 50 percent (50%) of the thickness of the outer rim of the inner metallic butterfly disc of the butterfly disc. The smallest sealing width of the portion of the unequal-width conical surface near the middle portion of the butterfly disc exceeds 70 percent (70%) of the thickness of the outer rim of the inner metallic butterfly disc of the butterfly disc. These arrangements can promote the resistance to static pressure torque greatly and reduce the risk of the leakage related to static pressure.

Problem 6: Resistance to high temperatures. The unequal-width conical surface has a larger sealing width, and the interference sliding of the unequal-width curved surface is smooth, thereby decreasing the material deformation of the inner surface of the lining and having better temperature resistance and pressure resistance. The tubular portion of the lining does not have a complicated structure, and the deformation caused by high temperatures is greatly reduced. The trapezoidal groove formed on the inner side of the valve body can accept the expansion of the back-up ring caused by high temperatures.

Problem 7: Strength of the butterfly disc. The bulging portions of the butterfly disc are separate and there is no diametral connection. The butterfly disc flank having a board-like cross section or a cone-like cross section can provide high strength.

BRIEF DESCRIPTION OF THE DRAWINGS

FIG. 5Ai is a schematic view showing the contact points where the butterfly disc and the inner surface of the lining of this invention meet along the cross-sectional line c-c;

FIG. 5Aii is a schematic view showing the contact point where the butterfly disc and the inner surface of the lining of this invention meet along the cross-sectional line b-b;

FIG. 5Aiii is a schematic view showing the contact point where the butterfly disc and the inner surface of the lining of this invention meet along the cross-sectional line a-a;

FIG. 5B is a schematic view showing the sealing status where the butterfly disc of this invention is in contact with the lining and adds press forces to cause the lining and the back-up ring to become deformed;

FIG. 5C is a top plan view showing the butterfly disc of this invention in an axial direction;

FIG. 6A is a schematic view showing a slit passage of the butterfly valve of this invention;

FIG. 6Bi is a curve diagram of the flow coefficient Cv of the butterfly valve of this invention at different opening degrees;

FIG. 6Bii is a curve diagram of the flow coefficient Cv of 3-inch butterfly valve of Reference 10 at different opening degrees;

FIG. 6Biii is a curve diagram of the flow coefficient Cv of 3-inch butterfly valve of Reference 11 at different opening degrees;

FIG. 8Ai is a schematic view showing the contact points where a ribbon sealing butterfly disc of the conventional fluoroplastic butterfly valve and the inner surface meet along the cross-sectional line c-c;

FIG. 8Aii is a schematic view showing the contact point where a ribbon sealing butterfly disc of the conventional fluoroplastic butterfly valve and the inner surface meet along the cross-sectional line b-b;

FIG. 8Aiii is a schematic view showing the contact point where a ribbon sealing butterfly disc of the conventional fluoroplastic butterfly valve and the inner surface meet along the cross-sectional line a-a;

FIG. 9Ai is a schematic view showing the contact points where a conventional linear sealing butterfly disc and the inner surface meet along the cross-sectional line c-c;

FIG. 9Aii is a schematic view showing the contact point where a conventional linear sealing butterfly disc and the inner surface meet along the cross-sectional line b-b;

FIG. 9Aiii is a schematic view showing the contact point where a conventional linear sealing butterfly disc and the inner surface meet along the cross-sectional line a-a;

DETAILED DESCRIPTION OF THE PREFERRED EMBODIMENTS

Figure 1:
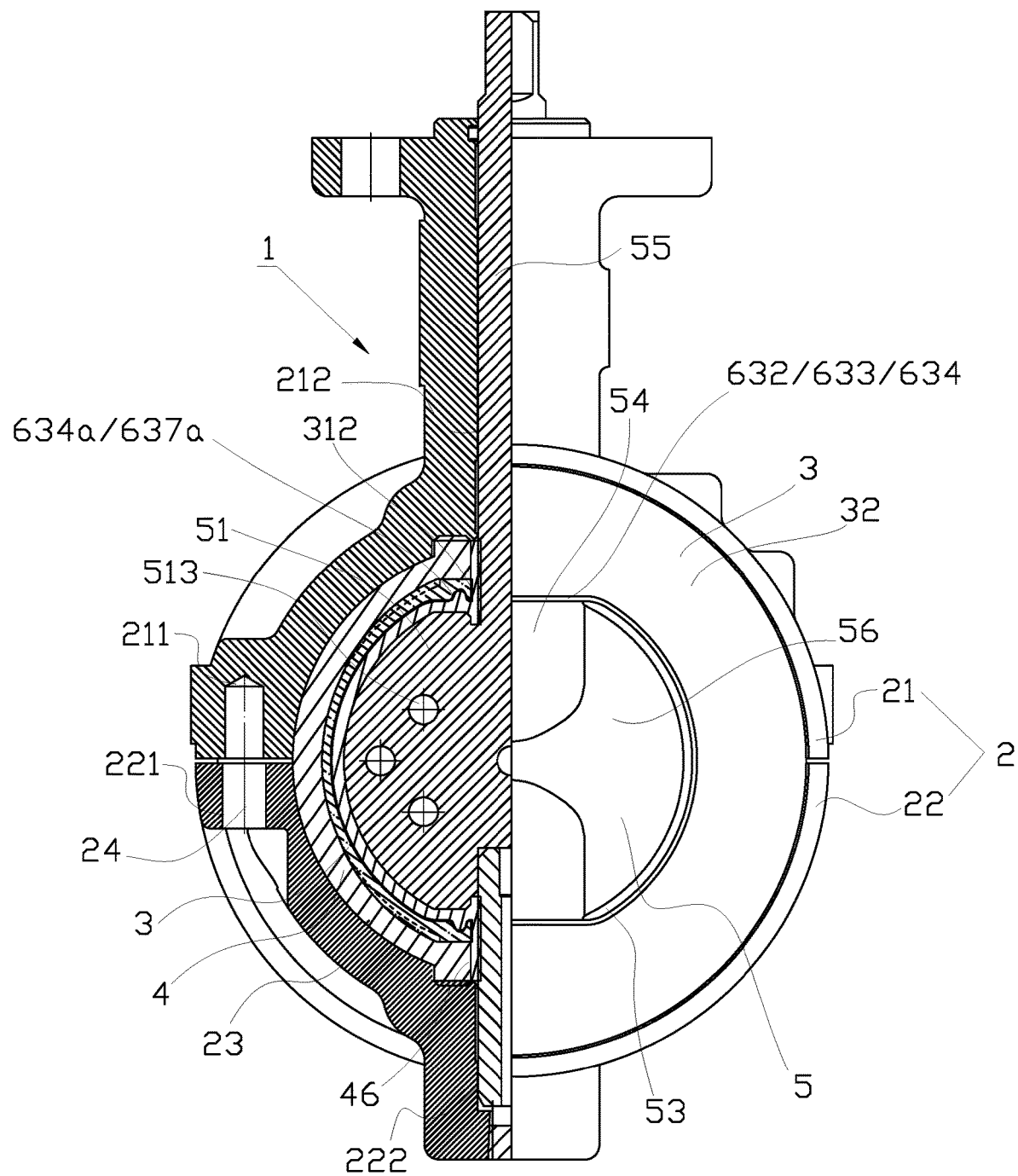
FIG. 1 is a schematic view showing the appearance and installation of a fluoroplastic butterfly valve of this invention.

Referring to FIGS. 1, 2A, 2B, 3, 4A, 4B, 4C and 4D, a fluoroplastic symmetrical butterfly valve 1 includes a valve body 2, a lining 3, a back-up ring 4 and a butterfly disc 5.

Figure 3:
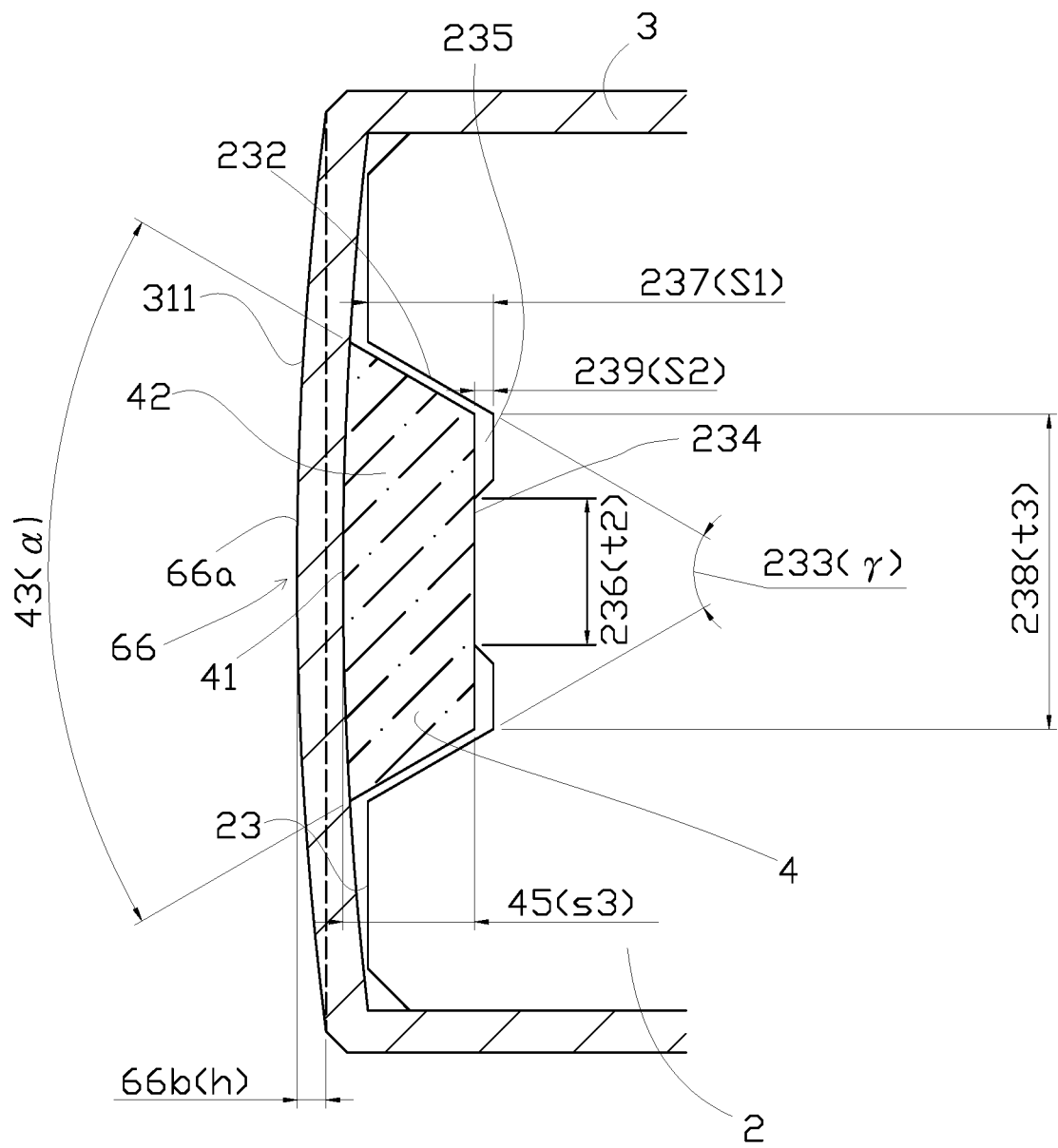
FIG. 3 is a schematic view showing the combination of the lining and a back-up ring.

The valve body 2 is formed in a circular ring shape and is horizontally divided into a semicircular-shaped two-piece part, namely an upper valve body 21 and a lower valve body 22. Two fasteners are used to fasten the two valve bodies together to become united. The upper valve body 21 and the lower valve body 22 are installed in an axial direction. The upper valve body 21 has a fastening portion 211 and a shaft hole portion 212 disposed thereon, and the lower valve 22 has a fastening portion 221 and a shaft hole portion 222 disposed thereon. An inner peripheral surface 23 of the valve body 2 is formed to allow an installation of the fluoroplastic lining 3. The inner peripheral surface 23 forms a groove 232 with a trapezoidal cross section which defines an included angle 233(γ), serving to receive the back-up ring 4 having a trapezoidal cross section 42 and defining an included angle 43(α), as shown in FIG. 3. A projecting ring 234 is disposed on a bottom of the groove 232. A height 239($s2$) of the projecting ring 234 is smaller than a groove depth 237($s1$) of the groove 232. A width 236($t2$) of the projecting ring 234 ranges from 1.5 to 2 times a thickness 631($t1$) of an inner metallic butterfly disc 51 of the butterfly disc 5 but is smaller than a bottom width 238($t3$), as shown in FIG. 4A.

The lining 3, disposed in correspondence with the valve body 2, is formed in a circular ring shape. The lining 3 has an inner diametral side and an outer diametral side. Two ends of the lining 3 each form a radial flange 32. The lining includes a tubular portion 31. An outer diameter 315 of the tubular portion 31 is installed on the inner peripheral surface 23 of the valve body 2. While closing, a butterfly disc outer rim 53 of the butterfly disc 5 presses against a cylindrical inner surface 311 of the lining of the tubular portion 31, supported by the valve body 2 and the back-up ring 4, in order to close the flow of fluid and bear the fluid pressure and temperature. Two axial ends of the lining 3 each are formed with a horizontal sealing plane 632. A thickness of the horizontal sealing plane 632 is larger than a thickness of the tubular portion 31. The horizontal sealing planes 632 are set by a flat structure on the inner diametral side and the outer diametral side to allow a diametral distance between the two horizontal sealing planes 632 to be smaller than an inner diameter of the tubular portion 31. An inner diametral side of the horizontal sealing plane 632 of the lining 3 and an inner diametral side of the tubular portion 31 of the lining 3 are connected, and the connection forms a joint edge 633 which is formed in an arc shape. A shaft hole 312 is formed on the horizontal sealing plane 632, and the inner diametral side and an outer diametral side of the horizontal sealing plane 632 each form a shaft hole surface 634 which surrounds an outer periphery of the shaft hole 312 for press sealing. A sealing recess 634a is formed on the shaft hole surface 634 and located on the inner diametral side. The shaft hole surface 634 located on the inner diametral side, the joint edge 633 and the inner surface 311 of the lining are connected to construct a full sealing surface 6. On the outer diametral side of the horizontal sealing plane 632 are respectively formed reinforcement portions 318 which are located on two sides of the shaft hole 312 and arranged along a central axis 25. A width of the reinforcement portion 318 exceeds two times the thickness 631($t1$) of the inner metallic butterfly disc 51 of the butterfly disc 5, thereby allowing smooth variations in the thicknesses of the horizontal sealing plane 632 and the tubular portion 31 to solve the leakage of the joint edge 633. The central axis 25 is an axis perpendicular to the axial direction and passing a center of the shaft hole 312.

Referring to FIG. 3, the back-up ring 4 is an elastic body made of rubber and is installed between the groove 232 of the inner peripheral surface 23 of the valve body 2 and the tubular portion 31 of the fluoroplastic lining 3. A shaft hole portion 46 is disposed according to the demand for a valve shaft 55 of the butterfly disc 5. An inner diameter 41 of the back-up ring 4 is basically equal to an inner diameter of the valve body 2. When the back-up ring 4 is installed inside the groove 232, an expansion room 235 is defined to supply the need of heat expansion under high temperatures. When the back-up ring 4 is tightly pressed, more than 80 percent (80%) of the expansion room 235 can be filled, and the whole room is almost filled by the heat expansion under high temperatures. The outer diameter 315 of the tubular portion 31 is basically equal to the inner diameter of the valve body 2. The inner diameter 41 of the back-up ring and the inner surface 311 of the lining is slightly small and protrudes inwards because of shrinkage during the manufacturing process. A thickness 45($s3$) of the back-up ring plus the height 239($s2$) of the projecting ring 234 equals the depth 237($s1$) of the groove 232. However, the shrinkage and the deformation occurred in the manufacturing process may cause the thickness 45($s3$) of the back-up ring 4 to be slightly large and render the inner diameter of the back-up ring 4 slightly smaller than the inner diameter of the valve body 2. The inner surface 311 of the lining also protrudes inwards because of the aforementioned shrinkage to cause the cross section of the inner surface 311 of the lining to have a swelling curve 66a. These arrangements need a process control whereby a swelling height 66b(h) is set within a reasonable range. Because the installation of the butterfly disc 5 in the tubular portion 31 of the lining 3 needs to generate a sufficient packing amount 65(ε) in order to attain the sealing effect, the swelling height 66b(h) needs to be controlled and included in the calculation of the packing amount 65(ε) during the manufacturing process. The packing amount 65(ε) is shown in FIG. 5A.

Figure 4A:
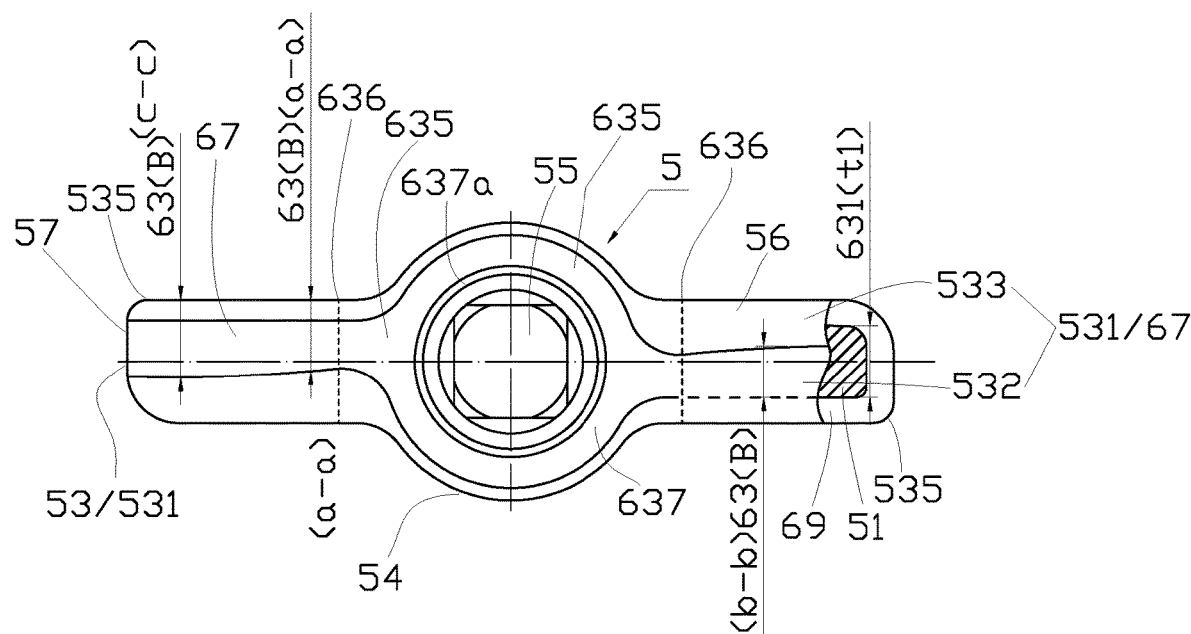
FIG. 4A is a top plan view showing a butterfly disc of this invention in an axial direction.
Figure 4B:
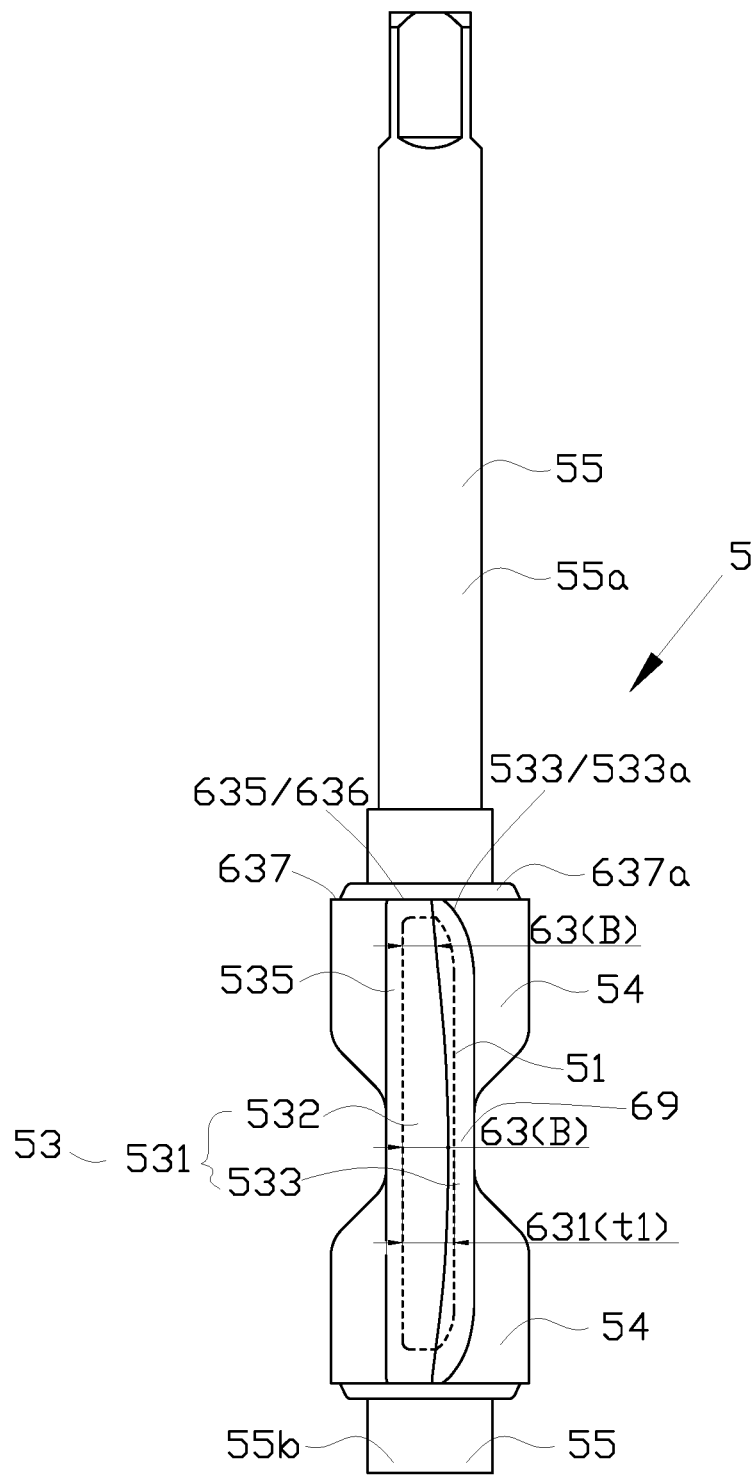
FIG. 4B is a side elevational view of the butterfly disc of this invention.
Figure 7A:
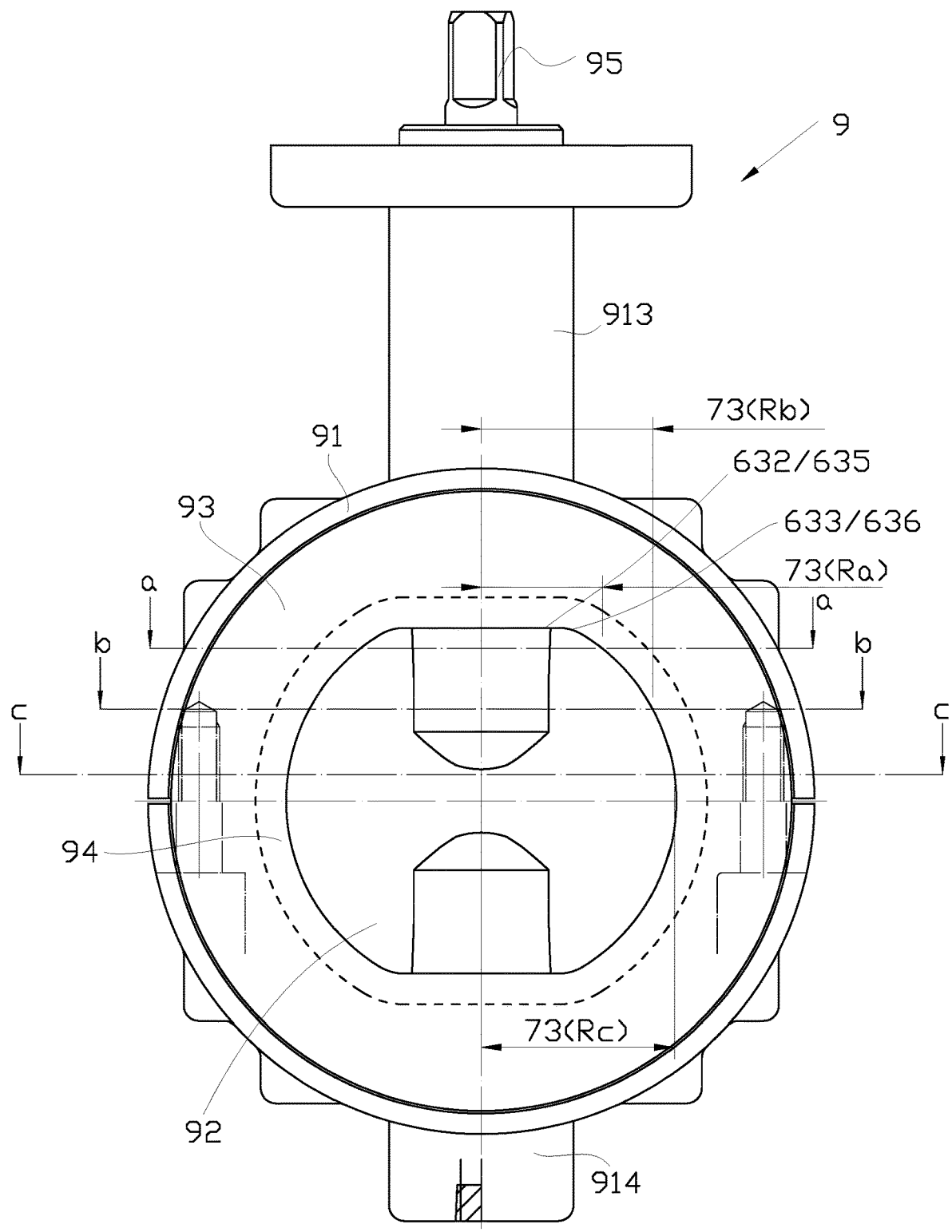
FIG. 7A is a schematic view showing an appearance of a conventional fluoroplastic butterfly valve.
Figure 7B:
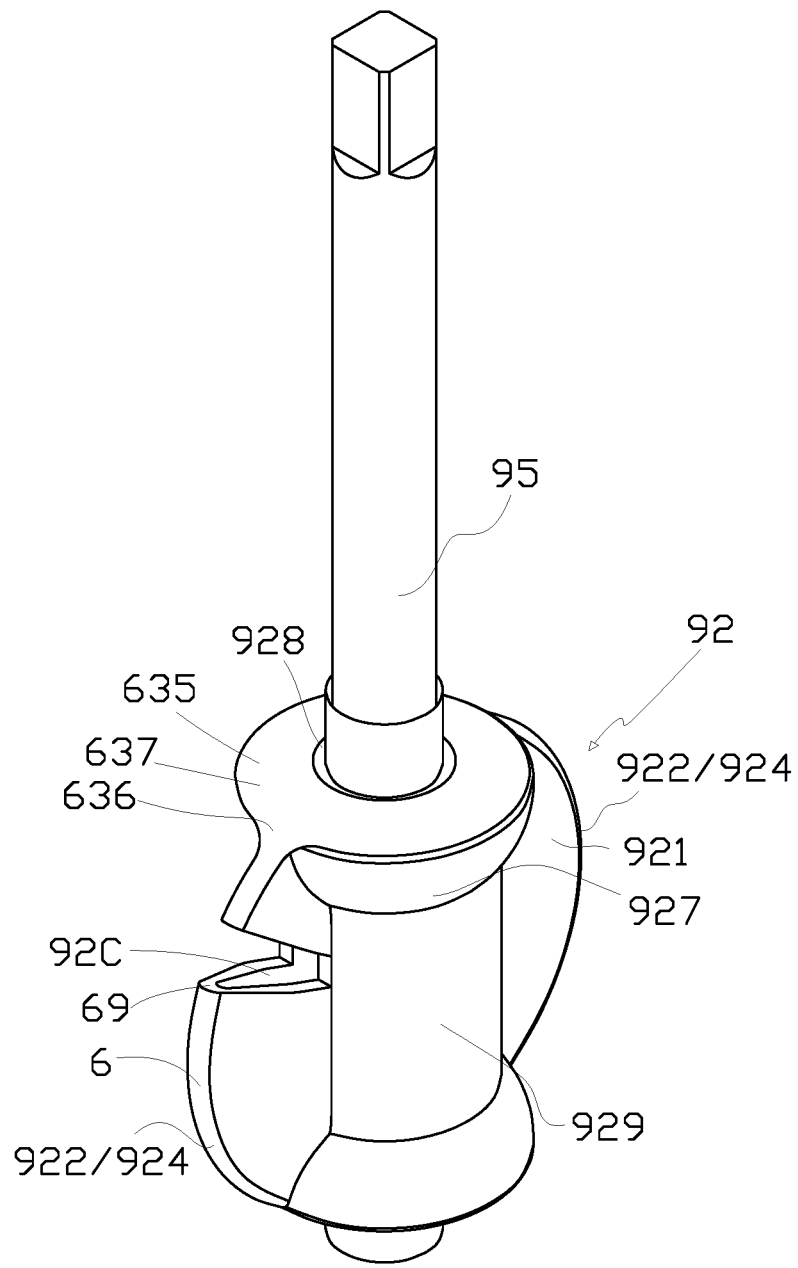
FIG. 7B is a perspective view showing the structure of a conventional fluoroplastic-encapsulated butterfly disc.
Figure 7C:
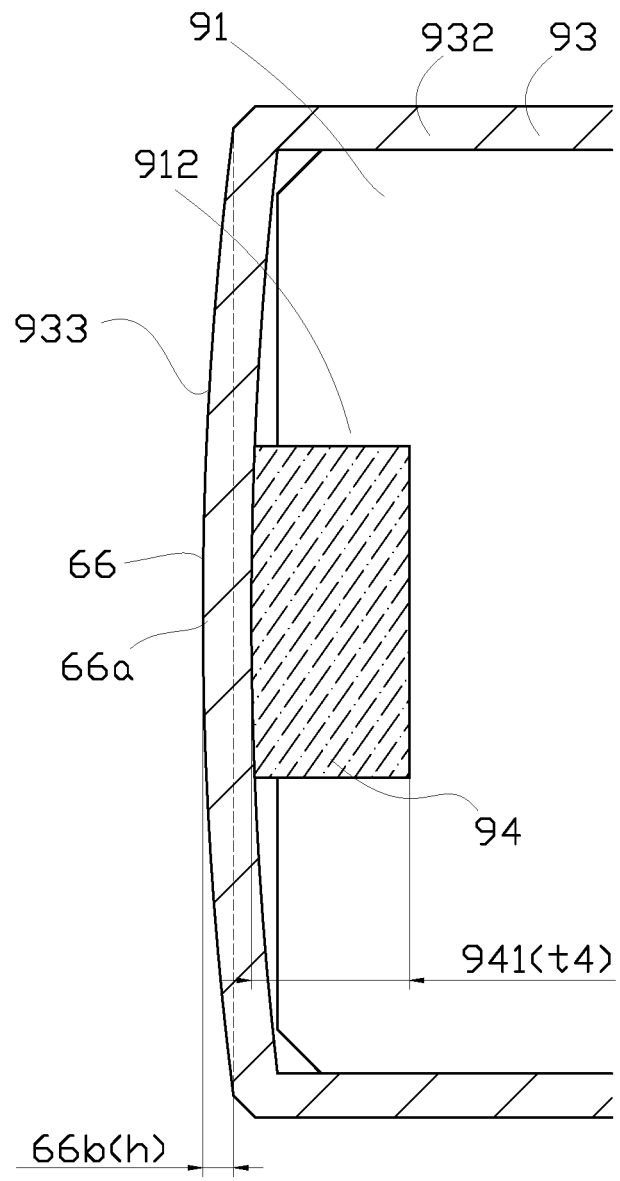
FIG. 7C is a schematic view showing the combination of a lining and a back-up ring of the conventional fluoroplastic butterfly valve.
Figure 7D:
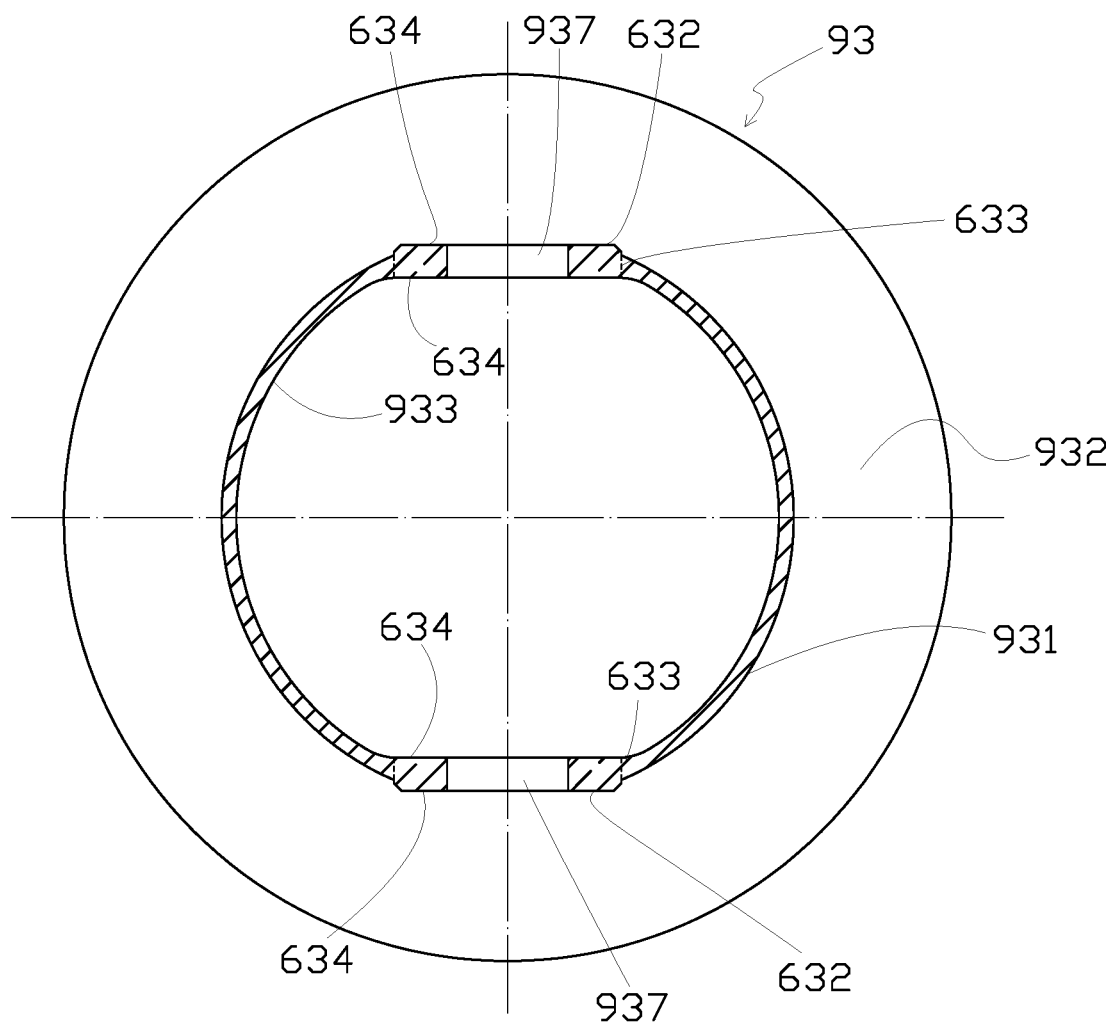
FIG. 7D is a cross-sectional view showing a tubular portion of the lining of the conventional fluoroplastic butterfly valve.
Figure 7E:
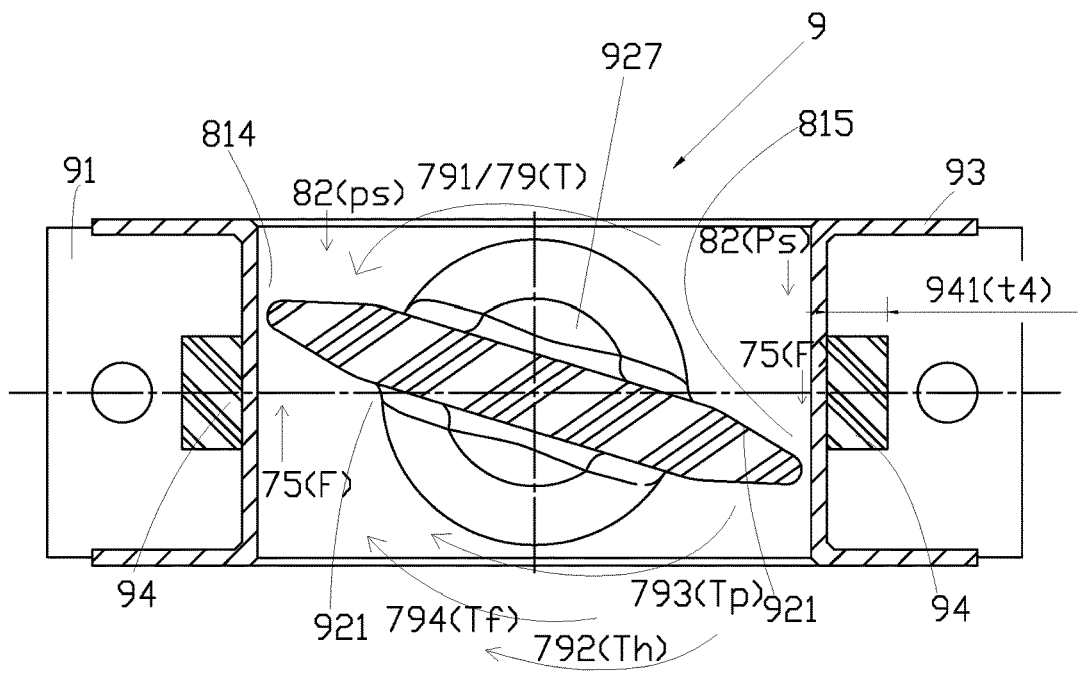
FIG. 7E is a schematic view showing the required torque when the conventional butterfly disc closes the butterfly valve.
Figure 7F:
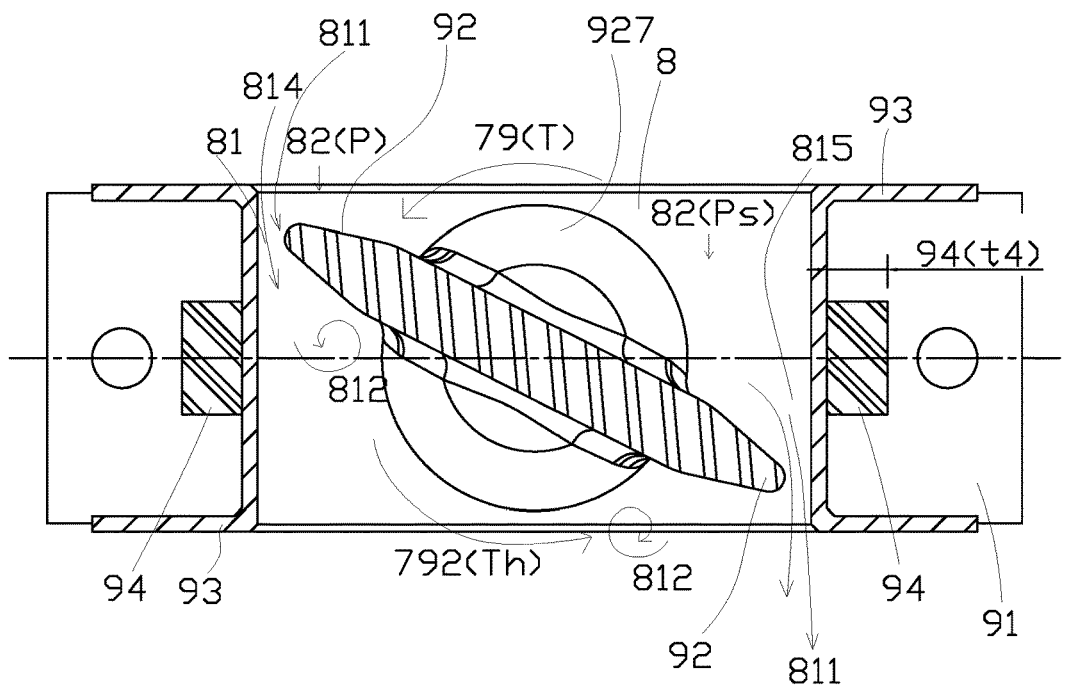
FIG. 7F is a schematic view showing the required torque when the conventional butterfly disc opens the butterfly valve to form a slit passage.
Figure 8B:
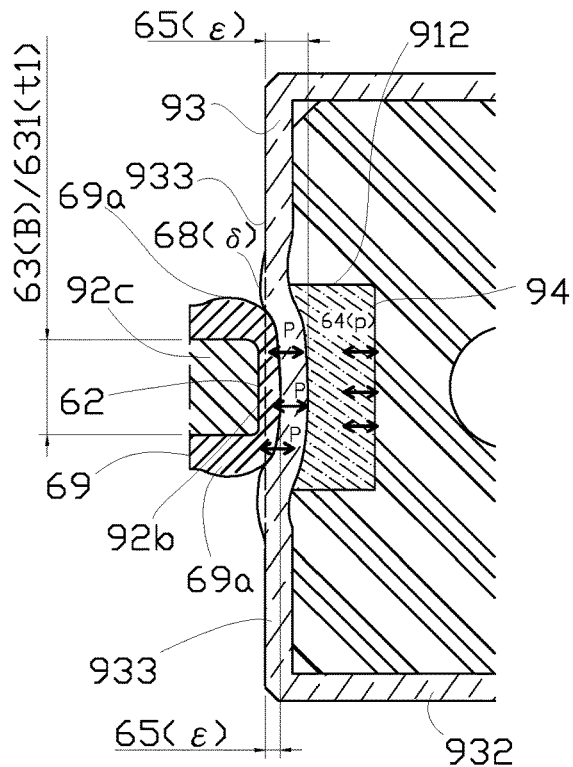
FIG. 8B is a schematic view showing the deformation of the sealing surface and the press pressure of the ribbon sealing of the conventional fluoroplastic butterfly valve.
Figure 8C:
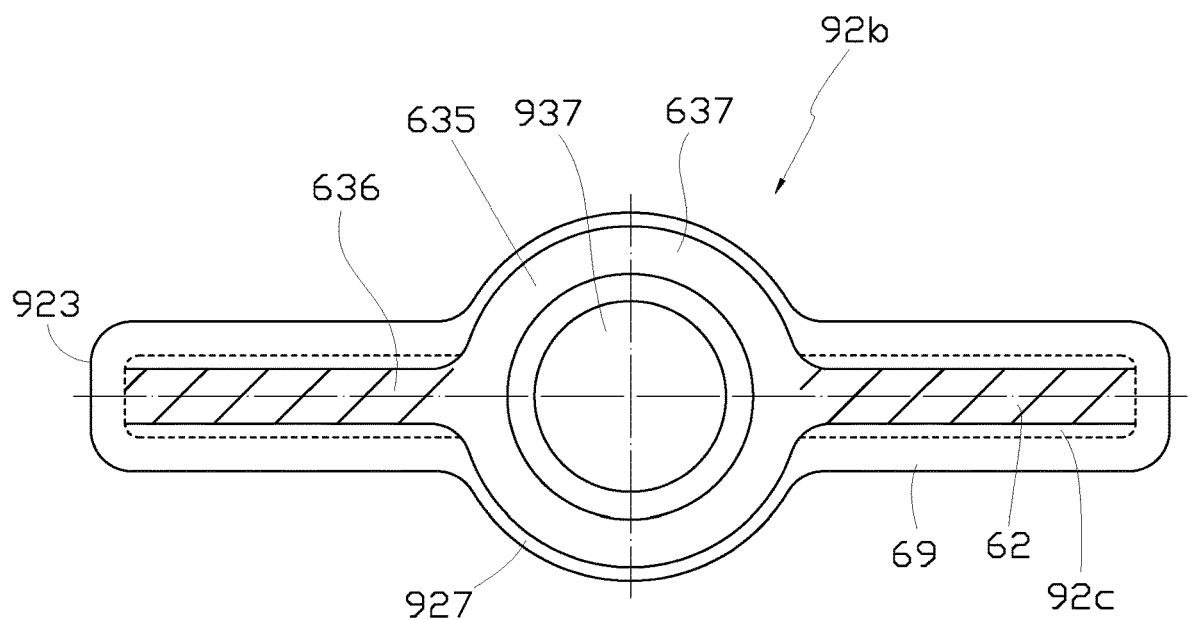
FIG. 8C is a schematic view showing the shape of the sealing surface of the ribbon sealing of the conventional fluoroplastic butterfly valve.
Figure 8D:
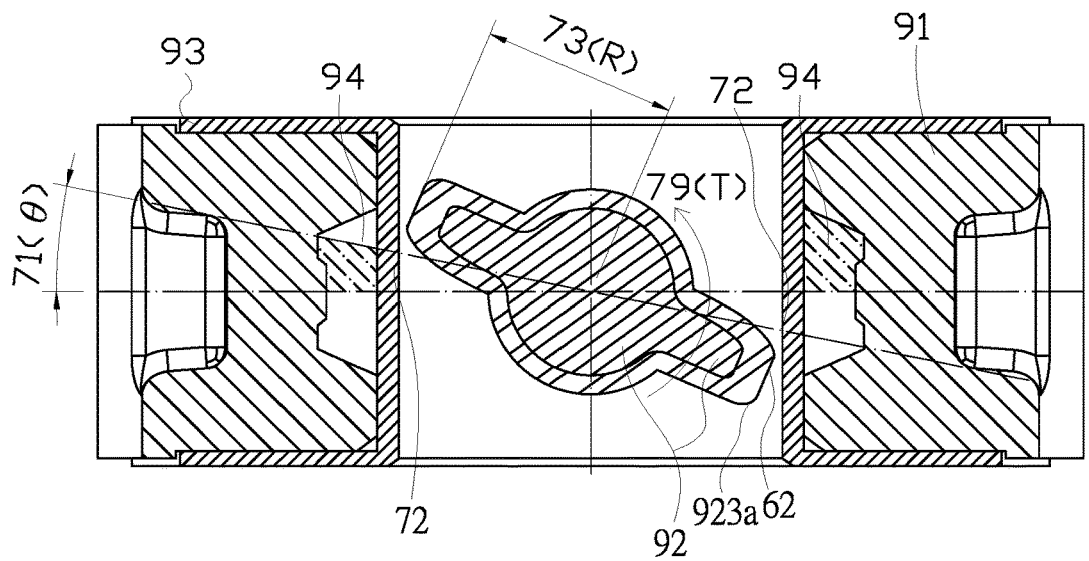
FIG. 8D is a cross-sectional view showing the contact point where the ribbon sealing of the conventional fluoroplastic butterfly disc and the inner surface meet along the cross-sectional line a-a.
Figure 8E:
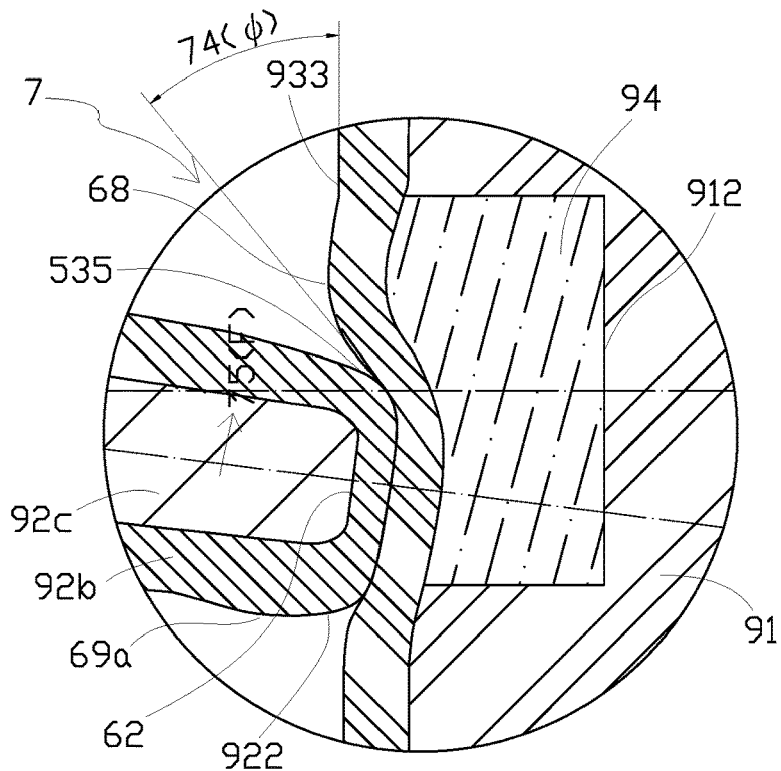
FIG. 8E is a cross-sectional view showing the interference sliding of the ribbon sealing of the conventional fluoroplastic butterfly valve.
Figure 9B:
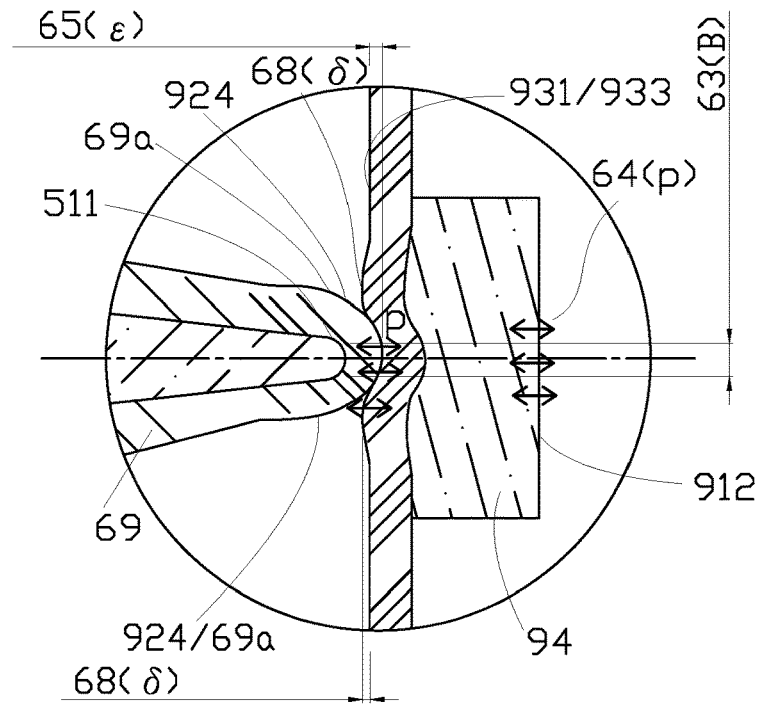
FIG. 9B is a schematic view showing the deformation of the sealing surface and the press pressure of the linear sealing of the conventional fluoroplastic butterfly valve.
Figure 9C:
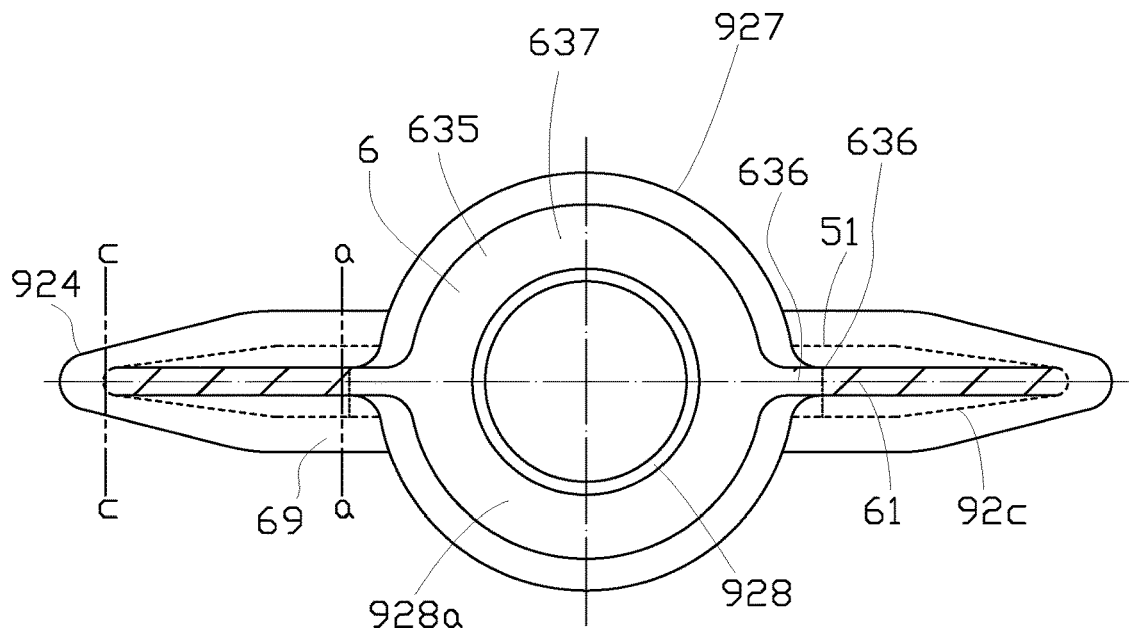
FIG. 9C is a schematic view showing the shape of the sealing surface of the linear sealing of the conventional fluoroplastic butterfly valve.
Figure 9D:
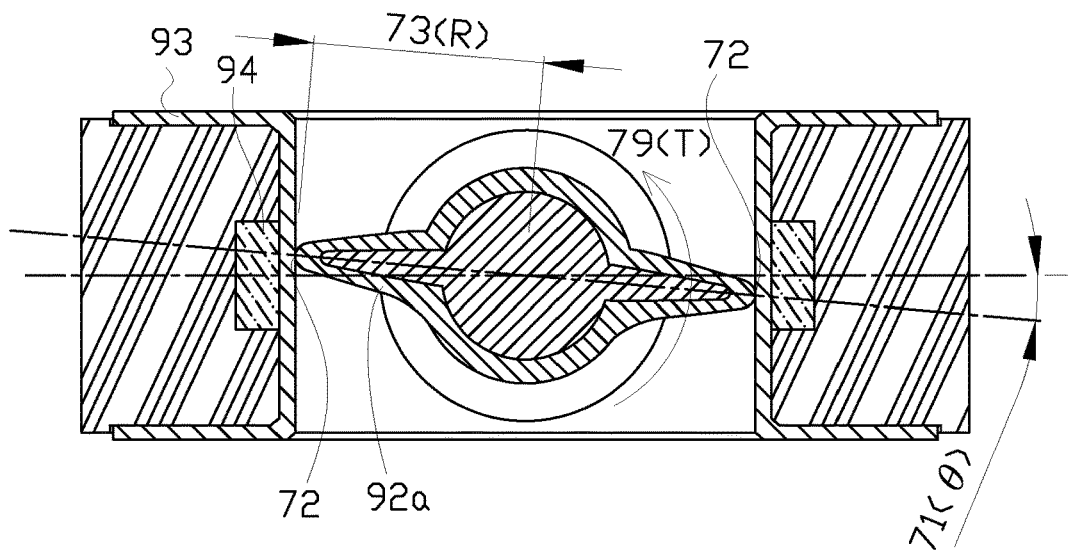
FIG. 9D is a cross-sectional view showing the contact point where the linear sealing of the conventional fluoroplastic butterfly valve and the inner surface meet along the cross-sectional line a-a.
Figure 9E:
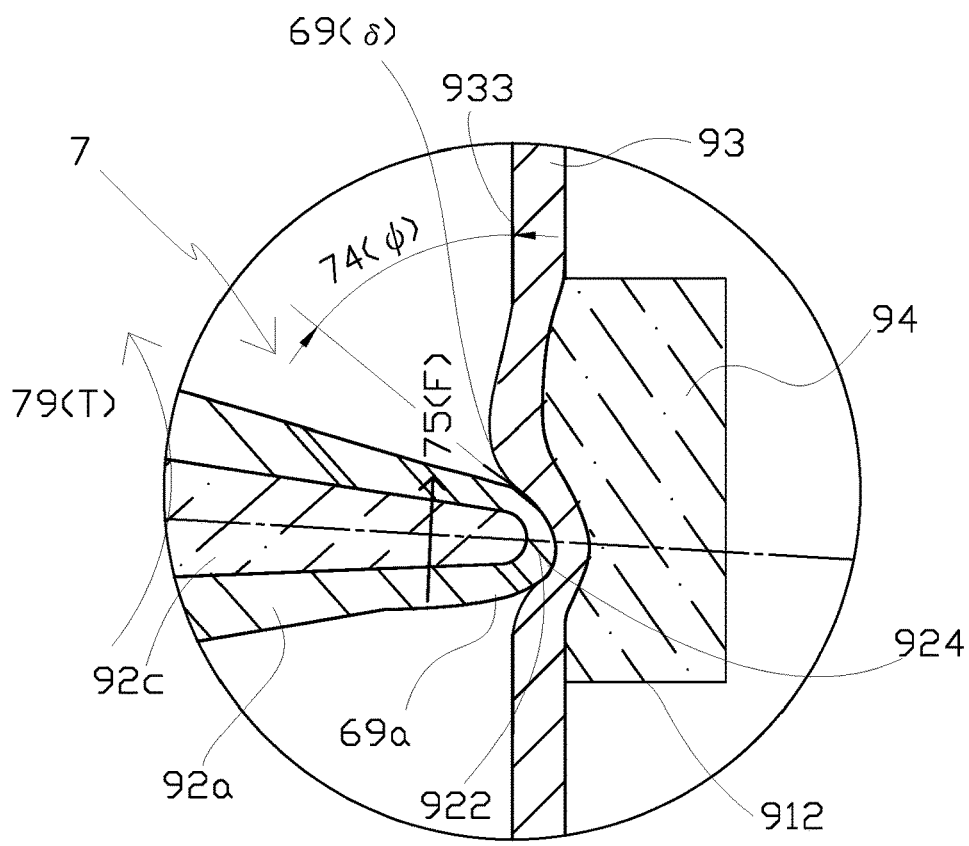
FIG. 9E is a cross-sectional view showing the interference sliding of the linear sealing of the conventional fluoroplastic butterfly valve.

Referring to FIGS. 4A, 4B, 4C, and 4D, the butterfly disc 5 is formed in a disc-like shape, and the butterfly disc 5 has a butterfly disc outer rim 53. The butterfly disc outer rim 53 has an annular curved surface 531. Two axial ends of the butterfly disc 5 each form a horizontal sealing end surface 635. The horizontal sealing end surface 635 is formed in correspondence with the horizontal sealing plane 632 of the lining 3. The horizontal sealing end surface 635 and the annular curved surface 531 are connected, and the connection forms a side cutting edge 636 which is formed in an arc shape. The side cutting edge 636 is formed in correspondence with the joint edge 633 located on the inner diametral side of the lining 3 for sealing. The horizontal sealing end surface 635 and the horizontal sealing plane 632 are axially and perpendicularly pressed against each other for sealing. The sealing between the side cutting edge 636 and the joint edge 633 is changed from a vertical sealing to a radial sealing. Because the reinforcement portion 318 smoothens the thickness, the tight press becomes even and no fluid leaks out of the valve shaft 55. A bulging portion 54 and the valve shaft 55 are disposed on the horizontal sealing end surface 635. The valve shaft 55 and the bulging portion 54 are concentric. The valve shaft 55 includes a long upper valve shaft 55a and a short lower valve shaft 55b. The valve shaft 55 passes two shaft holes 312 of the lining 3 and is installed in the shaft hole portion 212 of the upper valve body 21 and the shaft hole portion 222 of the lower valve body 22, so the butterfly disc 5 can rotate to adjust the flow amount or open and close the valve. The bulging portions 54 divide the butterfly disc 5 into two butterfly disc flanks 56. The butterfly disc flank 56 can have a board-like cross section or a cone-like cross section. For example, a large-sized butterfly valve uses a cone-like cross section, as shown in FIG. 7E, and a small-sized butterfly valve uses a board-like cross section, as shown in FIG. 4A.

An outer diameter of the butterfly disc outer rim 53 of the butterfly disc 5 is slightly larger than an inner diameter of the inner surface 311 of the lining, and half of the difference between them is the packing amount 65(ε) for a unilateral radius, as shown in FIG. 5A. A compression ratio of the sealing surface 6 is a number of the packing amount 65(ε) compared to the thickness 45(s3) of the back-up ring 4. According to the adopted material of the back-up ring 4 and the demand for pressure resistance and temperature resistance, the compression ratio ranges from 15 percent (15%) to 22 percent (22%), and the thickness 631(t1) of the metallic butterfly disc 51 at the outer rim of the butterfly disc flank 56 can provide a complex sealing with a sealing width larger than or equal to 4 mm, namely ≥4 mm while taking a 3-inch butterfly disc as an example, as shown in FIG. 4A.

Referring to FIG. 1, on a shaft sealing surface 637 of the bulging portion 54 of the horizontal sealing end surface 635 is disposed a protuberant sealing ring 637a capable of sealing the sealing recess 634a of the shaft hole surface 634 and reducing an outer diameter of the bulging portion 54. Accordingly, the press sealing between the butterfly disc outer rim 53 and the inner surface 311 of the lining is also connected to the shaft sealing surface 637 and the shaft hole surface 634 to thereby form a continuously reliable sealing surface 6, including the sealing between the horizontal sealing end surface 635 and the horizontal sealing plane 632.

Figure 4C:
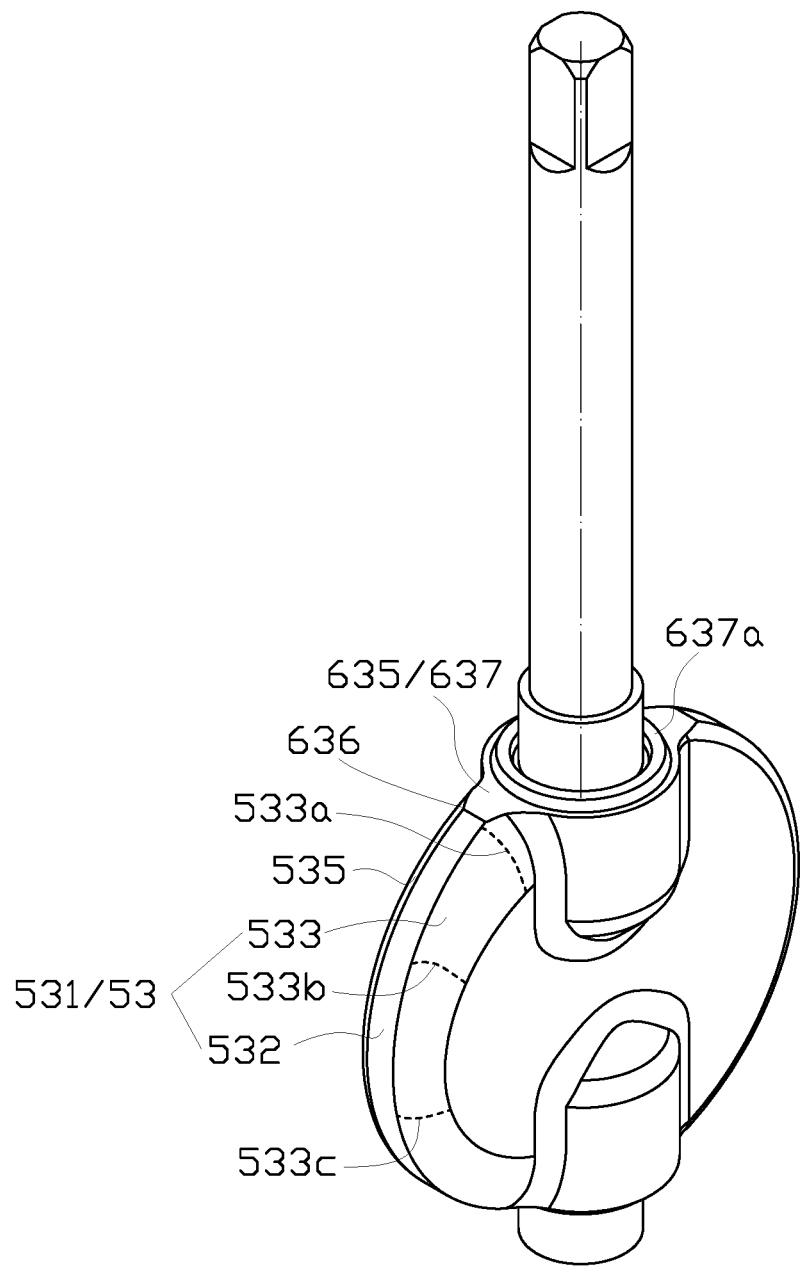
FIG. 4C is a perspective view showing an unequal-width conical surface and an unequal-width curved surface of the butterfly disc of this invention.
Figure 4D:
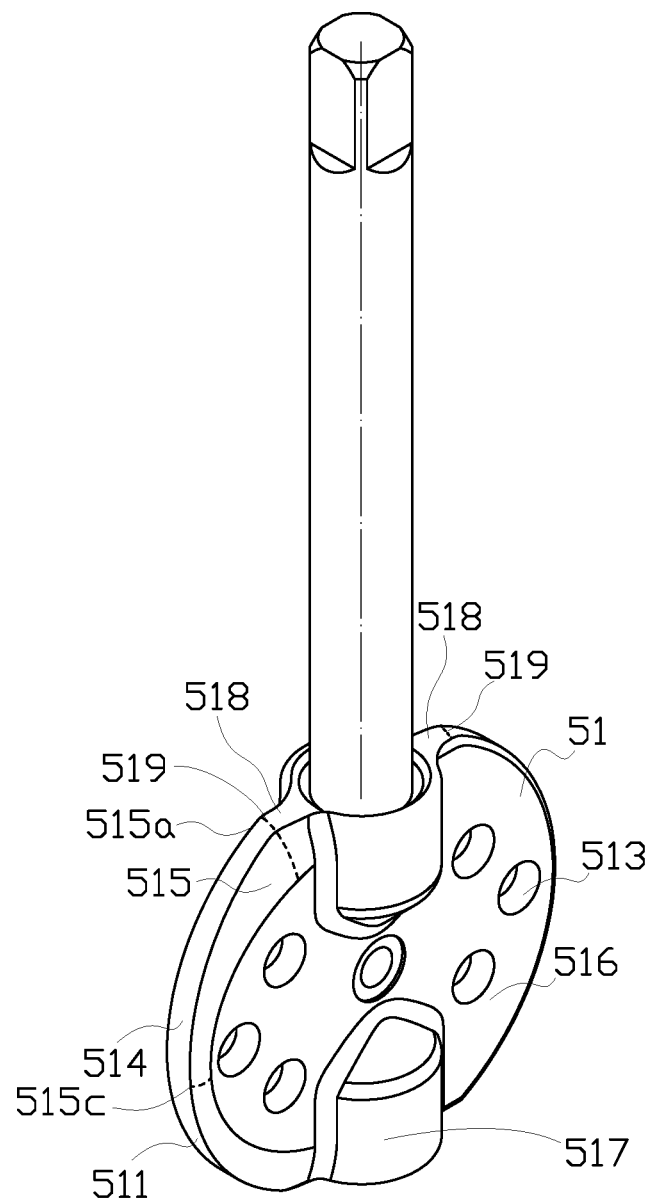
FIG. 4D is a perspective showing a metallic butterfly disc of the butterfly disc of this invention.
Figure 5D:
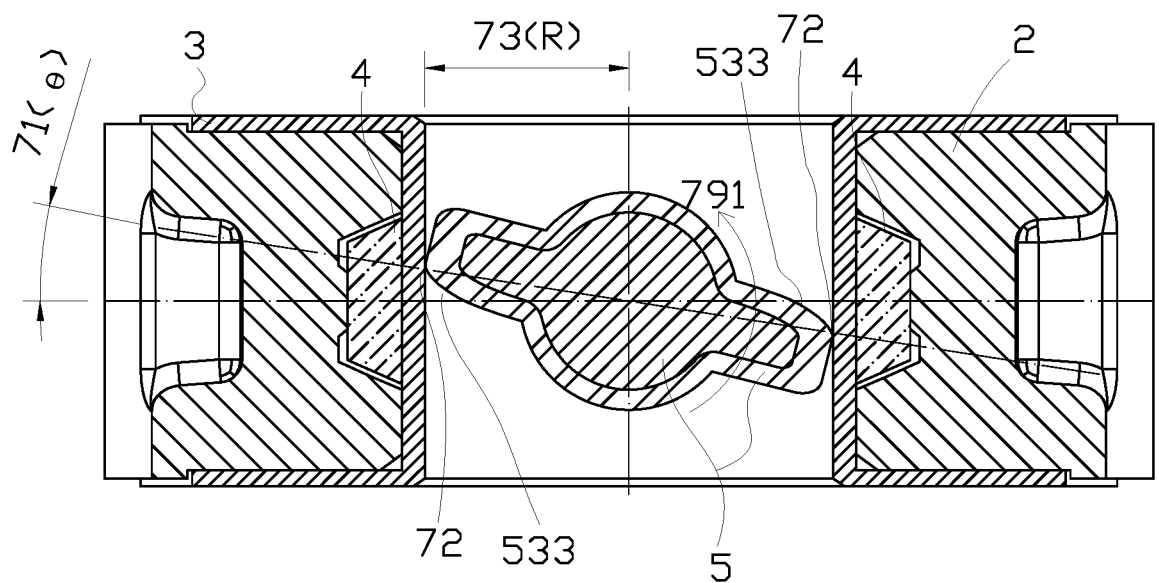
FIG. 5D is a cross-sectional view showing the contact point where the butterfly disc of this invention is in contact with the inner surface of the lining along the cross-sectional line a-a.
Figure 5E:
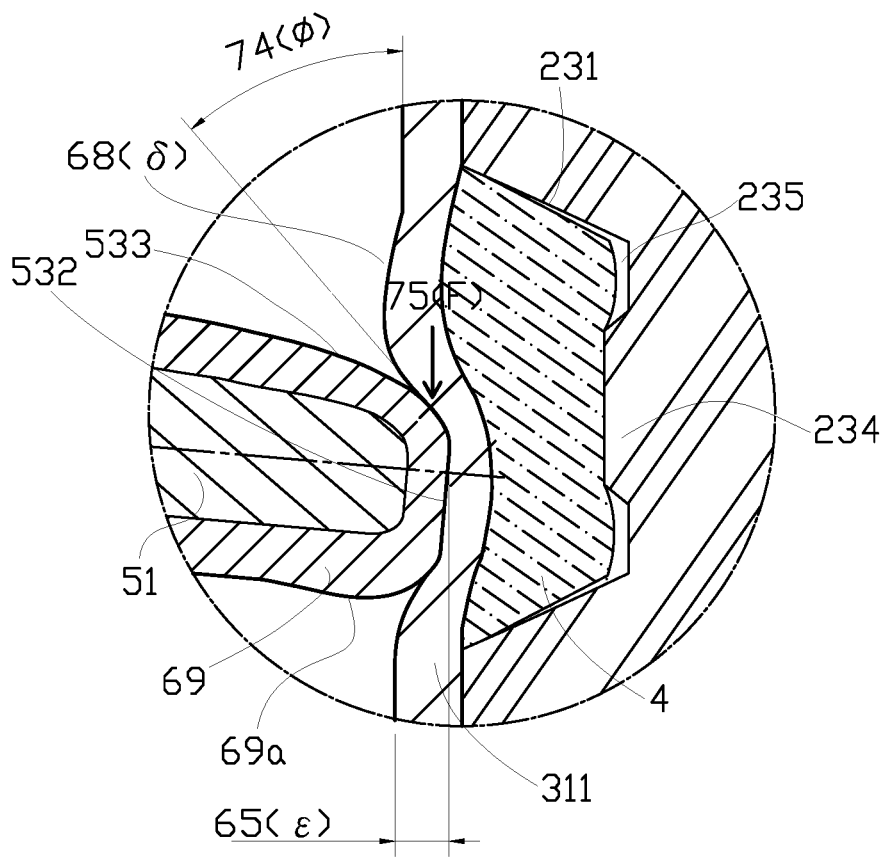
FIG. 5E is a cross-sectional view showing the interference sliding of the butterfly disc of this invention.

Referring to FIGS. 4A, 4B, 4C, and 4D, the butterfly disc outer rim 53 has a complex sealing structure 67 capable of resisting high temperatures and high pressure, attaining low torque and having a good service life. The complex sealing structure 67 includes: the annular curved surface 531 of the butterfly disc outer rim 53 is a smooth curved surface comprised of an unequal-width conical surface 532 and an unequal-width curved surface 533. The unequal-width curved surface 533 is disposed in a closing direction 791 of the butterfly disc 5, as shown in FIG. 5D. Respective positions along cross-sectional lines a-a, b-b and c-c are the same as the positions along the cross-sectional lines of the conventional butterfly valve shown in FIG. 7A. A portion of the unequal-width conical surface 532 along the line a-a having a smaller sealing width 63(B), a portion thereof along the line b-b has a larger sealing width 63(B), and a portion thereof along the line c-c has a largest sealing width 63(B). In other words, the structure widens progressively from the portion near the valve shaft 55 towards the portion near the middle portion of the butterfly disc 5, and the unequal-width conical surface 532 is constructed as a part of the sealing surface 6. A side of the unequal-width conical surface 532 opposite to the unequal-width curved surface 533 forms a corner edge 535 having a small arc radius connected to a superficial face of the butterfly disc flank 56. The corner edge 535 is disposed in an opening direction of the butterfly disc 5. The corner edge 535 and the inner surface 311 of the lining generate an extreme small interference sliding 7. The unequal-width curved surface 533 extends from the superficial face of the butterfly disc flank 56 to the outer rim 53. The portion of the unequal-width curved surface 533 along the line a-a has a longest smooth arc 533a, the portion thereof along the line b-b has a shorter smooth arc 533b, and the portion thereof along the line c-c has a shortest smooth arc 533c. In other words, the structure narrows progressively from the portion near the valve shaft 55 towards the portion near the middle portion of the butterfly disc 5. The unequal-width curved surface 533 makes an interference sliding 7 with the inner surface 311 of the lining. The longest smooth arc 533a, the shorter smooth arc 533b and the shortest smooth arc 533c are formed in a curve analogous to an elliptical curve. The short diameter of the ellipse is perpendicular to the superficial face of the butterfly disc flank 56. These curves can be constructed by multiple arcs. An outer rim 511 of the inner metallic butterfly disc 51 of the butterfly disc 5 also has a corresponding curved structure including butterfly disc flanks 516, bulging portions 517, horizontal sealing end surfaces 518 and side cutting edges 519, as shown in FIG. 4D. An unequal-width conical surface 514 is also provided, and an unequal-width curved surface 515 has a longest arc 515a along the cross-sectional line a-a and a shortest arc 515c along the cross-sectional line c-c.

Figure 2A:
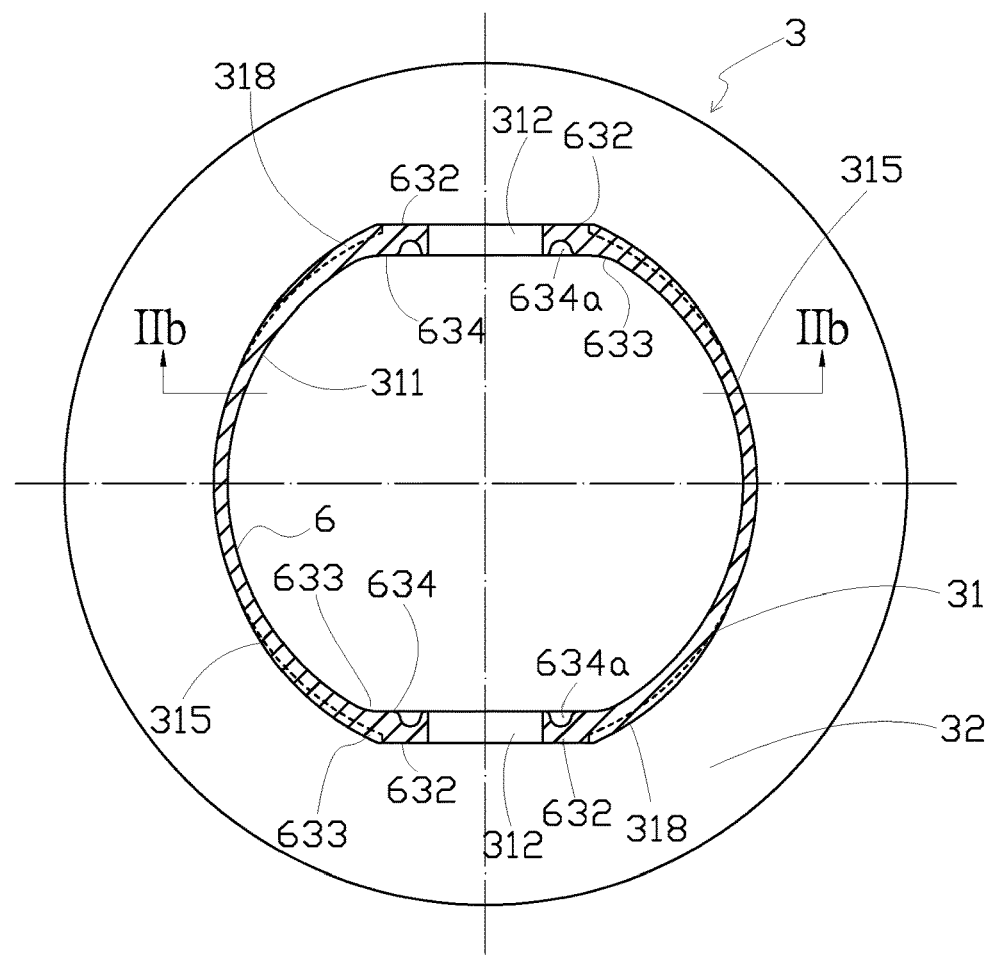
FIG. 2A is a cross-section view showing a lining with reinforcement portions.
Figure 2B:
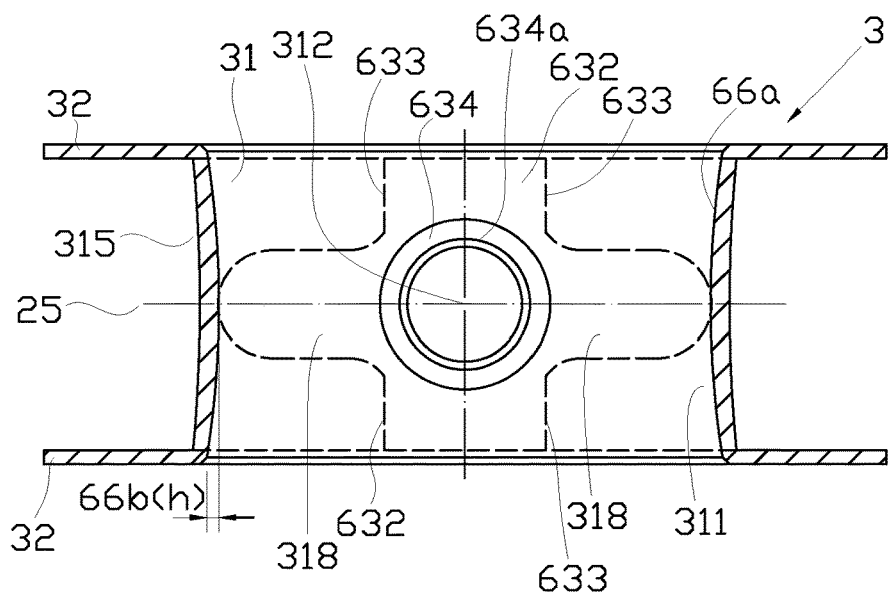
FIG. 2B is a plan view showing the sealing of the lining with reinforcement portions.

Referring to FIG. 4A, the complex sealing structure 67 can fulfill the resistance to high temperatures and high pressure. It is herein taken as an example that a butterfly valve whose caliber is 3 inches, the thickness of the outer rim of the metallic butterfly disc 51 is 8 mm, the sealing width 63(B) of the portion of the unequal-width conical surface 532 along the line a-a exceeds 50 percent (50%) of the thickness 631(t1) of the outer rim of the inner metallic butterfly disc 51, and the sealing width thereof is above 4 mm. Further, the sealing width 63(B) of the portion of the unequal-width conical surface 532 along the line c-c exceeds 70 percent (70%) of the thickness 631(t1) of the outer rim of the inner metallic butterfly disc 51, and the sealing width thereof is above 5.6 mm. The unequal-width conical surface 532 and the inner surface 311 of the lining are pressed against each other to define the continuously reliable sealing surface 6, and the press sealing is also connected to the shaft sealing surface 637 and the shaft hole surface 634, as shown in FIG. 2A and FIG. 4C. The sealing surface 6 has the largest radius and bears the largest moment of static pressure at the portion along the line c-c to attain the largest sealing width 63(B) whereby the higher pressure resistance and the better airtight capability are provided. This sealing width 63(B) is not smaller than the width of the conventional ribbon sealing 62.

Referring to FIGS. 5Ai, 5Aii, and 5Aiii, the complex sealing structure 67 shown in FIGS. 4A through 4D can fulfill the low torque and have a good life time because the portion of the unequal-width curved surface 533 along the line a-a has a smaller contact angle 71(θ) and decreases the sliding distance greatly, and the contact angle 71(θ) of the unequal-width curved surface 533 approaches the contact angle 71(θ) of the conventional linear sealing.

Referring to FIGS. 5Ai, 5Aii, 5Aiii, 5B, 5C, 5D and 5E, the complex sealing structure 67 shown in FIGS. 4A through 4D can fulfill the low torque and have a good life time. More specifically, in terms of the portion of the complex sealing structure 67 along the line a-a during the closing operation, there is an interference sliding 7 generated between the unequal-width curved surface 533 and the inner surface 311 of the lining, and the unequal-width curved surface 533 slides forwards at a sliding angle 74(φ) so that a friction force 75(F) can impinge on the inner surface 311 of the lining, cause a depression at a place to which the press is added, and cause a lining deformation 68(δ) which protrudes forwards on a frontal side of the butterfly disc outer rim 53. The material of the inner surface 311 of the lining having the lining deformation 68(δ) bears the press, and the magnitude of deformation varies according to the value of the packing amount 65(ε). The material of the inner surface 311 of the lining on the rear side of the butterfly disc outer rim 53 bears the tension. The sliding angle 74(φ) and the lining deformation 68(δ) of the complex sealing structure 67 are smaller than those of the ribbon sealing 62 and the linear sealing 61. When the sliding angle 74(φ) and the lining deformation 68(δ) become larger, it is more unfavorable for using at high temperatures. In other words, materials of the inner surface 311 of the lining and the external fluoroplastic encapsulation 69 of the butterfly disc 5 suffer more creep and friction forces 75(F).

Referring to FIG. 6A, when the butterfly disc 5 is open or closed, the butterfly disc 5 forms a certain opening degree whereby a flow passage 8 forms a slit passage 81, and a sharply widening flow passage 814 and a gradually reducing flow passage 815 are respectively generated on both sides of the butterfly disc 5, as arrowed by a streamline 811 in the figure. When fluid flows, a circulation zone 812 appears at the back side of the butterfly disc 5. The unequal-width curved surface 533 of the butterfly disc outer rim 53 of the butterfly disc 5 can provide the slit passage 81 with more flow areas, i.e. a slit width 813(W) becomes larger. This arrangement benefits an increase in the flow amount and Cv value of the butterfly disc 5 in a small-angled position and also reduces a fluid torque 792(Th).

The torque for closing the butterfly valve of this invention is 40 Ntm under an atmospheric pressure, and this torque is required when a 3-inch butterfly valve is adopted and set in a state of near 90 degrees. Torque which is less than 30 Ntm (<30 Ntm) is needed from 0 degrees to 80 degrees, and torque which is less than 20 Ntm (<20 Ntm) is needed while opening. These results show that the interference sliding 7 which the inner surface 311 of the lining experiences occurs smoothly, and the suffered friction force 75(F) is reduced. Particularly, when the required torque is reduced during the opening operation, the friction force 75(F) is largely decreased, and the service life of the butterfly valve 1 is prolonged.

In a preferred embodiment of this invention, tests are executed on a standard platform. Angles of the butterfly disc 5 are set at 0 degrees, 18 degrees, 36 degrees, 54 degrees, 72 degrees, and 90 degrees. When the angle is 0 degrees, a full open state is presented. When the angle is 90 degrees, a full closed state is presented. Table 1 is a result of the preferred embodiment showing the flow coefficient Cv. Table 2 is a result of Reference 10 showing the Cv value, and Table 3 is a result of Reference 11 showing the Cv value. FIGS. 6Bi, 6Bii and 6Biii are curve diagrams showing a curve A, a curve B, and a curve C at different opening degrees. The comparison between the butterfly valve of this invention and these two references is described as follows:

1. The linearity of the curve of the flow coefficient Cv of the butterfly disc of this invention is better than those of Reference 10 and Reference 11.
2. The flow coefficient Cv % is 16% when the butterfly disc of this invention has a low opening degree at 36 degrees. The Cv % is 9% when Reference 10 has an opening degree at 35 degrees. The Cv % is 11% when Reference 11 has an opening degree at 40 degrees.
3. The flow coefficient Cv % is 34% when the butterfly disc of this invention has a middle opening degree at 54 degrees. The Cv % is 23% when Reference 10 has an opening degree at 55 degrees. The Cv % is 26% when Reference 11 has an opening degree at 60 degrees.

TABLE 1

3" lined Butterfly Valve (the embodiment)

| | Open degree | | | | | |
|---|---|---|---|---|---|---|
| | 0 | 18 | 36 | 54 | 72 | 90 |
| Cv | 0 | 10.7 | 60.3 | 127.2 | 271 | 377.2 |
| Cv % | 0% | 3% | 16% | 34% | 72% | 100% |

TABLE 2

Reference 10 CN100376828C-Valve body of miter valve

| | Open degree | | | | | | | | | | | | | | | | | | |
|---|---|---|---|---|---|---|---|---|---|---|---|---|---|---|---|---|---|---|---|
| | 0 | 5 | 10 | 15 | 20 | 25 | 30 | 35 | 40 | 45 | 50 | 55 | 60 | 65 | 70 | 75 | 80 | 85 | 90 |
| Cv | 0 | 0 | 11.8 | 27 | 35.7 | 46.9 | 61.9 | 75.1 | 90.1 | 117.3 | 153.9 | 193.7 | 243.9 | 319.2 | 393.3 | 508.6 | 625 | 805.8 | 830.7 |
| CV % | 0% | 0% | 1% | 3% | 4% | 6% | 7% | 9% | 11% | 14% | 19% | 23% | 29% | 38% | 47% | 61% | 75% | 97% | 100% |

TABLE 3

Reference 11 Tomoe Valves
USA catalog-846t-847t-847q-20150601 lined 3butterfly valve

| | Open degree | | | | | | | | |
|---|---|---|---|---|---|---|---|---|---|
| | 0 | 20 | 30 | 40 | 50 | 60 | 70 | 80 | 90 |
| Cv | 0 | 9 | 25 | 56 | 85 | 130 | 225 | 396 | 500 |
| Cv % | 0% | 2% | 5% | 11% | 17% | 26% | 45% | 79% | 100% |

DESCRIPTIONS OF ELEMENTS 1 symmetrical butterfly valve
2 valve body
21 upper valve body
211 fastening portion
212 shaft hole portion
22 lower valve body
221 fastening portion
222 shaft hole portion
23 inner peripheral surface
232 groove
233($\gamma$) trapezoidal included angle
234 projecting ring
235 expansion room
236($t2$) width of the projecting ring
237($s1$) groove depth
238($t3$) bottom width
239($s2$) height of the projecting ring
24 fastening hole
25 central axis
3 lining
31 tubular portion
311 inner surface of the lining
312 shaft hole
315 outer diameter of the tubular portion
318 reinforcement portion
32 radial flange
4 back-up ring
41 inner diameter of the back-up ring
42 trapezoidal cross section
43($\alpha$) trapezoidal included angle
45($s3$) thickness
46 shaft hole portion
5 butterfly disc 51 metallic butterfly disc
511 outer rim
513 linking hole
514 unequal-width conical surface
515 unequal-width curved surface
515a longest arc
515c shortest arc
516 butterfly disc flank
517 bulging portion
518 horizontal sealing end surface
519 side cutting edge
53 butterfly disc outer rim
531 annular curved surface
532 unequal-width conical surface
533 unequal-width curved surface
533a longest smooth arc
533b shorter smooth arc
533c shortest smooth arc
54 bulging portion
544 shaft hole
55 valve shaft
55a upper valve shaft
55b lower valve shaft
56 butterfly disc flank
57 outer diameter of the butterfly disc
6 sealing surface
61 linear sealing
62 ribbon sealing
63(B) sealing width
631($t1$) thickness of the metallic butterfly disc
632 horizontal sealing plane
633 joint edge
634 shaft hole surface
634a sealing recess
635 sealing end surface
636 side cutting edge
637 shaft sealing surface
637a sealing ring
64($p$) press pressure
65($\varepsilon$) packing amount
66 inward protrusion
66a swelling curve
66b($h$) swelling height
67 complex sealing
68($\delta$) lining deformation
69 fluoroplastic encapsulation
69a encapsulation deformation
7 interference sliding
71($\theta$) contact angle
72 contact point
73(R) rotary moment arm
74(%) sliding angle
75(F) friction force
79(T) torque
791 rotational direction
792(Th) fluid torque
793(Tp) static pressure torque
794(Tf) friction torque
8 flow passage
81 slit passage
811 streamline
812 circulation zone
813(W) slit width
814 sharply widening flow passage
815 gradually reducing flow passage
82(Ps) static pressure
9 fluoroplastic butterfly valve
91 valve body
911 inner peripheral surface
912 groove
913 upper shaft hole portion
914 lower shaft hole portion
92 butterfly disc
92a linear sealing butterfly disc
92b ribbon sealing butterfly disc
92c metallic butterfly disc
921 butterfly disc flank
922 butterfly disc outer rim
923 annular curved surface
923a corner
924 conical curved surface
927 butterfly disc protrusion
928 shaft hole
929 diametral connection
93 lining
931 tubular portion
932 radial flange
933 inner surface of the lining
937 shaft hole
94 back-up ring
941($t4$) thickness
95 valve shaft

What is claimed is:

1. A fluoroplastic butterfly valve structure comprising:
a valve body being formed in a circular ring shape and being horizontally divided into an upper valve body and a lower valve body, each of said upper valve body and said lower valve body being formed in a semicircular shape, said upper valve body and said lower valve body being fastened together to become united, said upper valve body and said lower valve body being installed in an axial direction, said valve body having an inner peripheral surface, a groove with a trapezoidal cross section being formed in said inner peripheral surface;
a butterfly disc being formed in a disc shape and including a butterfly disc outer rim, respective horizontal sealing end surfaces being formed at two axial ends of said butterfly disc outer rim, each horizontal sealing end surface being connected to a respective annular curved surface of said butterfly disc outer rim at a respective place where a respective arc-shaped side cutting edge is formed, a valve shaft and a bulging portion being respectively disposed on each horizontal sealing end surface at said two axial ends of said butterfly disc outer rim, said valve shafts and said bulging portions being concentric, a shaft sealing surface and a protuberant sealing ring being disposed on each bulging portion; said shaft sealing surfaces, said arc-shaped side cutting edges and said annular curved surfaces being connected to form a butterfly disc sealing surface;
a lining disposed in correspondence with said valve body and being formed in a circular ring shaped, said lining having an inner diametral side and an outer diametral side, two ends of said lining each including a radial flange, said lining including a tubular portion, an inner diametral side of said tubular portion being an inner surface of said lining, two axial ends of said lining each being formed with a horizontal sealing plane, a thickness of said horizontal sealing planes being larger than a thickness of said tubular portion, a shaft hole and shaft hole surfaces being formed on each horizontal sealing plane, said shaft hole surfaces being formed on said inner diametral side and said outer diametral side around an outer periphery of each shaft hole, an inner diametral side of each respective horizontal sealing plane being connected to said inner diametral side of said tubular portion being connected at a respective place where a respective arc-shaped joint edge is formed, a sealing recess being formed on said shaft hole surfaces which are located on said inner diametral side; said shaft hole surfaces located on said inner diametral side, said respective arc-shaped joint edges, and said inner surface of said lining being connected to form a lining sealing surface, said lining being installed in said inner peripheral surface of said valve body; and a back-up ring being an elastic body with a trapezoidal cross section, said back-up ring being installed in said groove and fitting snugly with an outer diametral side of said tubular portion;

wherein with respect to said butterfly disc sealing surface and said lining sealing surface, said shaft hole surfaces are formed in correspondence with said shaft sealing surfaces and respectively form continuous and smooth sealing surfaces therebetween, said annular curved surface of said butterfly disc outer rim is formed in correspondence with said inner surface of said lining and form a continuous and smooth sealing surface therebetween, said protuberant sealing rings are located in correspondence with said respective sealing recess and respectively form a corresponding continuous and smooth sealing surface therebetween, and said arc-shaped joint edges are formed in correspondence with said respective arc-shaped side cutting edge to respectively form continuous and smooth sealing surfaces therebetween, an included angle at which said butterfly disc is orientated with respect to a central axis being 0 degrees when said butterfly disc is fully open, an included angle at which said butterfly disc is orientated with respect to said central axis being 90 degrees when said butterfly disc is fully closed, said central axis being an axis perpendicular to said axial direction and passing a center of said shaft holes, when said butterfly disc is changed from a full open state to a closed state, a portion of said butterfly disc outer rim near said valve shaft is in contact with inner surface of said lining first and then the contact between said butterfly disc outer rim and said inner surface of said lining moves from said portion near said valve shaft to a middle portion of said butterfly disc, a joint line being defined between a contact point where said butterfly disc outer rim and said inner surface of said lining meet and an axial center of rotation, a contact angle (θ) being formed between said joint line and said central axis, different contact angles (θ) being generated by any of contact points where said butterfly disc outer rim and said inner surface of said lining meet, when there is an interference sliding between said butterfly disc outer rim and said inner surface of said lining, a sliding surface being formed on a contact surface where said butterfly disc outer rim is in contact with a lining deformation (δ) of said lining, a sliding angle (ψ) being formed between a tangent of said sliding surface and a tangent of said inner surface of said lining perpendicular to said valve shaft, said annular curved surface including a complex sealing structure which has an unequal-width conical surface and an unequal-width curved surface, a portion of said unequal-width conical surface near said valve shaft having a smaller sealing width, while a portion thereof near a middle portion of said butterfly disc having a largest sealing width, said sealing width of said portion of said unequal-width conical surface near said valve shaft exceeding 50 percent (50%) of a thickness of an outer rim of an inner metallic butterfly disc of said butterfly disc, said sealing width of said portion thereof near said middle portion of said butterfly disc exceeding 70 percent (70%) of said thickness of said outer rim of said inner metallic butterfly disc, said unequal-width curved surface extending from a superficial face of said butterfly disc to said butterfly disc outer rim, a portion of said unequal-width curved surface near said valve shaft having a longest smooth arc, while a portion thereof near said middle portion of said butterfly disc having a shortest smooth arc, said unequal-width curved surface being disposed in a closing direction of said butterfly disc, said interference sliding being generated between said unequal-width curved surface and said inner surface of said lining while closing or opening said butterfly disc.

2. The fluoroplastic butterfly valve structure according to claim 1, wherein said inner metallic butterfly disc has said inner metallic butterfly disc and a fluoroplastic encapsulation, said inner metallic butterfly disc disc being enclosed by said fluoroplastic encapsulation, said annular curved surface being located on said fluoroplastic encapsulation, said outer rim of said inner metallic butterfly disc having a curved surface structure corresponding to said annular curved surface on said fluoroplastic encapsulation, an unequal-width conical surface, and an unequal-width curved surface, a portion of said unequal-width curved surface near said valve shaft having a longest smooth arc, while a portion thereof near said middle portion of said butterfly disc having a shortest smooth arc, said unequal-width curved surface being disposed in said closing direction of said butterfly disc.

3. The fluoroplastic butterfly valve structure according to claim 1, wherein when said butterfly valve is 3 inches, said butterfly disc is 8 mm in thickness, said sealing width of said portion of said butterfly disc outer rim near said valve shaft is above 4 mm, and said sealing width of said portion thereof near said middle portion of said butterfly disc is above 5.6 mm.

4. The fluoroplastic butterfly valve structure according to claim 1, wherein a compression ratio of said lining sealing surface is a number of a packing amount representing compression of said lining sealing surface by said butterfly disc sealing surface compared to a non-compressed thickness of said back-up ring, said compression ratio ranging from 15 percent (15%) to 20 percent (20%).

5. The fluoroplastic butterfly valve structure according to claim 1, wherein said bulging portions disposed at said two ends divide said butterfly disc into two butterfly disc flanks, said two butterfly disk flanks having a board-like cross section or a cone-like cross section.

6. The fluoroplastic butterfly valve structure according to claim 1, wherein a projecting ring is disposed on a bottom of said groove, a projecting height of said projecting ring being smaller than a groove depth of said groove, an expansion room being defined when said back-up ring is installed in said groove, a projecting width of said projecting ring ranging from 1.5 to 2 times a thickness of said inner metallic butterfly disc of said butterfly disc but being smaller than a bottom width of said groove.

7. The fluoroplastic butterfly valve structure according to claim 1, wherein an inner diameter of said back-up ring is substantially equal to an inner diameter of said valve body, and an outer diameter of said tubular portion is substantially equal to said inner diameter of said valve body.

8. The fluoroplastic butterfly valve structure according to claim 1, wherein said smooth arc of said unequal-width curved surface corresponds to an elliptical contour.

9. A fluoroplastic butterfly valve structure comprising:
a valve body being formed in a circular ring shape and being horizontally divided into an upper valve body and a lower valve body, each of said upper valve body and said lower valve body being formed in a semicircular shape, each of said upper valve body and said lower valve body having a fastening portion and a shaft hole portion, said upper valve body and said lower valve body being fastened together to become united, said upper valve body and said lower valve body being installed in an axial direction, said valve body including an inner peripheral surface, a groove with a trapezoidal cross section being formed in said inner peripheral surface;
a butterfly disc being formed in a disc shape and including a butterfly disc outer rim, respective horizontal sealing end surfaces being formed at two axial ends of said butterfly disc outer rim, each horizontal sealing end surface being connected to a respective annular curved surface of said butterfly disc outer rim at a respective place where a respective arc-shaped side cutting edge is formed, a valve shaft and a bulging portion being respectively disposed on each horizontal sealing end surface at said two axial ends of said butterfly disc outer rim, said bulging portions and said valve shafts being concentric, a shaft sealing surface and a protuberant sealing ring being disposed on each bulging portion; said shaft sealing surface, said arc-shaped side cutting edges and said annular curved surfaces being connected to form a butterfly disc sealing surface;
a lining being formed in a circular ring shape and disposed in correspondence with said valve body, said lining having an inner diametral side and an outer diametral side, two ends of said lining each including a radial flange, said lining including a tubular portion, an inner diametral side of said tubular portion being an inner surface of said lining, two axial ends of said lining each being formed with a horizontal sealing plane, a thickness of said horizontal sealing planes being larger than a thickness of said tubular portion, a shaft hole and shaft hole surfaces being formed on each horizontal sealing plane, said shaft hole surfaces being formed on said inner diametral side and said outer diametral side around an outer periphery of each shaft hole, an inner diametral side of each respective horizontal sealing plane being connected to said inner diametral side of said tubular portion being connected at a respective place where a respective arc-shaped joint edge is formed, a sealing recess being formed on said shaft hole surfaces which are located on said inner diametral side; said shaft hole surfaces located on said inner diametral side, said respective arc-shaped joint edges and said inner surface of said lining being connected to form a lining sealing surface, said lining being installed in said inner peripheral surface of said valve body; and
a back-up ring being an elastic body with a trapezoidal cross section, said back-up ring being installed in said groove and fitting snugly with an outer diametral side of said tubular portion;
wherein with respect to said butterfly disc sealing surface and said lining sealing surface, said shaft hole surfaces are formed in correspondence with said shaft sealing surfaces and respectively form continuous and smooth sealing surfaces therebetween, said annular curved surface of said butterfly disc outer rim is formed in correspondence with said inner surface of said lining and form a continuous and smooth sealing surface therebetween, said protuberant sealing rings are located in correspondence with said respective sealing recess and respectively form a corresponding continuous and smooth sealing surface therebetween, and said arc-shaped joint edges are formed in correspondence with said respective arc-shaped side cutting edge;
wherein reinforcement portions are respectively formed on an outer diametral side of said horizontal sealing planes and located on two sides of said shaft hole along said tubular portion, a width of each reinforcement portion exceeding two times a thickness of an inner metallic butterfly disc of said butterfly disc to thereby allow said thicknesses of a respective horizontal sealing plane and said tubular portion to be smoothly varied.

10. The fluoroplastic butterfly valve structure according to claim 9, wherein said reinforcement portion smoothens a thickness of said arc-shaped joint edge.

11. A fluoroplastic butterfly valve structure comprising:
a valve body; and
a butterfly disc pivotally connected to said valve body by a valve shaft, a pivotal rotation of said valve shaft allowing said butterfly disc to open or close said valve body;
wherein said butterfly disc has a butterfly disc outer rim, said butterfly disc outer rim having an annular curved surface, said annular curved surface including an unequal-width conical surface, a sealing width of said unequal-width conical surface increasing progressively from said valve shaft to a middle portion of said butterfly disc, a sealing width of a portion of said unequal-width conical surface near said valve shaft exceeding 50 percent (50%) of a thickness of an outer rim of an inner metallic butterfly disc, a sealing width of a portion of said unequal-width conical surface near said middle portion of said butterfly disc exceeding 70 percent (70%) of said thickness of said outer rim of said inner metallic butterfly disc.

12. The fluoroplastic butterfly valve structure according to claim 11, wherein said annular curved surface further includes a complex sealing structure which has an unequal-width curved surface and an unequal-width conical surface, said unequal-width curved surface extending from a superficial face of said butterfly disc to said butterfly disc outer rim, a smooth arch of said unequal-width curved surface narrowing progressively from said valve shaft to said middle portion of said butterfly disc, said unequal-width curved surface being disposed in a closing direction of said butterfly disc.

* * * * *